US010458781B2

(12) United States Patent
Odaira et al.

(10) Patent No.: US 10,458,781 B2
(45) Date of Patent: Oct. 29, 2019

(54) SAMPLE SHAPE MEASURING METHOD AND SAMPLE SHAPE MEASURING APPARATUS

(71) Applicant: OLYMPUS CORPORATION, Tokyo (JP)

(72) Inventors: Mayumi Odaira, Akiruno (JP); Yoshimasa Suzuki, Kawasaki (JP); Kazuo Kajitani, Hachioji (JP); Hisashi Ode, Chofu (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 16/028,936

(22) Filed: Jul. 6, 2018

(65) Prior Publication Data

US 2018/0313643 A1 Nov. 1, 2018

Related U.S. Application Data

(63) Continuation of application No. PCT/JP2016/050482, filed on Jan. 8, 2016.

(51) Int. Cl.
*G01B 11/24* (2006.01)
*G01B 11/26* (2006.01)
(Continued)

(52) U.S. Cl.
CPC .............. *G01B 11/24* (2013.01); *G01B 11/26* (2013.01); *G02B 21/0004* (2013.01); *G02B 21/0096* (2013.01); *G02B 21/086* (2013.01)

(58) Field of Classification Search
CPC ..... G01B 11/26; G01B 11/24; G01B 11/2513; G02B 21/086; G02B 21/0096; G02B 21/0004; G02B 21/082; G02B 21/084
See application file for complete search history.

(56) References Cited

U.S. PATENT DOCUMENTS 6,587,183 B1 * 7/2003 Uomori ................. G01B 11/25
 348/E5.058
7,277,566 B2 10/2007 Miyawaki et al.
(Continued)

FOREIGN PATENT DOCUMENTS

JP 2004109348 A 4/2004
JP 2004163129 A 6/2004
(Continued)

OTHER PUBLICATIONS

International Preliminary Report on Patentability together with the Written Opinion from related International Application No. PCT/JP2016/050482 dated Jul. 19, 2018.
(Continued)

*Primary Examiner* — Sang H Nguyen
(74) *Attorney, Agent, or Firm* — Scully, Scott, Murphy & Presser, P.C.

(57) ABSTRACT

A sample shape measuring method includes a step of preparing illumination light passing through a predetermined illumination region, a step of applying the illumination light to a sample, and a predetermined processing step. The predetermined illumination region is set such that the illumination light is applied to part of inside of a pupil and outside of the pupil, a light intensity of the illumination light incident on the predetermined illumination region differs between a center and a periphery. The predetermined processing step includes a step of receiving light transmitted through the observation optical system, a step of obtaining a quantity of light of the received light, a step of calculating a difference or a ratio between the quantity of light and a reference quantity of light, and a step of calculating an amount of tilt in a surface of the sample from the difference or the ratio.

14 Claims, 31 Drawing Sheets

(51) Int. Cl.
  *G02B 21/00* (2006.01)
  *G02B 21/08* (2006.01)

(56) References Cited

U.S. PATENT DOCUMENTS

| | | | |
|---|---|---|---|
| 9,175,953 B2* | 11/2015 | Kuramoto | G01B 11/2441 |
| 9,291,450 B2 | 3/2016 | Takahashi | |
| 2002/0008865 A1* | 1/2002 | Shirai | G01C 15/00 |
| | | | 356/4.04 |
| 2004/0061914 A1 | 4/2004 | Miyawaki et al. | |
| 2008/0218768 A1* | 9/2008 | Kodama | B21C 37/0811 |
| | | | 356/610 |
| 2011/0292405 A1* | 12/2011 | Dunn | G01B 9/02004 |
| | | | 356/511 |
| 2011/0310377 A1* | 12/2011 | Ohishi | G01S 7/497 |
| | | | 356/5.01 |
| 2012/0212747 A1* | 8/2012 | Yuki | G01B 11/007 |
| | | | 356/511 |
| 2013/0235478 A1* | 9/2013 | Maeda | G01M 11/005 |
| | | | 359/718 |
| 2014/0152794 A1 | 6/2014 | Takahashi | |
| 2015/0378021 A1* | 12/2015 | Nagano | G01S 7/486 |
| | | | 356/5.01 |
| 2018/0073865 A1* | 3/2018 | Suzuki | G01B 11/26 |

FOREIGN PATENT DOCUMENTS

| | | |
|---|---|---|
| JP | 2005208027 A | 8/2005 |
| JP | 2008020498 A | 1/2008 |
| JP | 2009008643 A | 1/2009 |
| JP | 2009168582 A | 7/2009 |
| JP | 2014109492 A | 6/2014 |

OTHER PUBLICATIONS

International Search Report and Written Opinion dated Mar. 15, 2016 issued in PCT/JP2016/050482.

* cited by examiner

LIGHT INTENSITY

DISTANCE FORM OPTICAL AXIS

LIGHT INTENSITY

DISTANCE FORM OPTICAL AXIS

SAMPLE SHAPE MEASURING METHOD AND SAMPLE SHAPE MEASURING APPARATUS

CROSS-REFERENCE TO RELATED APPLICATION

The present application is a continuation application of International Application No. PCT/JP2016/050482 filed on Jan. 8, 2016, the entire contents of which are incorporated herein by reference.

BACKGROUND OF THE INVENTION

Field of the Invention

The present invention relates to a method and an apparatus for measuring an inclination and a shape in a surface of a sample.

Description of the Related Art

As examples of an apparatus for measuring a three-dimensional shape of a sample, an apparatus disclosed in Japanese Patent Application Laid-open No. 2014-109492 and an apparatus disclosed in Japanese Patent Application Laid-open No. 2008-20498 are available.

In the apparatus of Japanese Patent Application Laid-open No. 2014-109492, the three-dimensional shape of a sample is measured by a fringe projection method. In the apparatus of Japanese Patent Application Laid-open No. 2014-109492, image pickup means includes a projection unit, a light-receiving unit, an illumination light output unit, a stage, and a measurement control unit. The projection unit includes a pattern generating unit, and a pattern generated by the pattern generating unit is projected onto a sample. The pattern projected onto the sample is picked up by the light-receiving unit, whereby a fringe image is obtained. In the apparatus of Japanese Patent Application Laid-open No. 2014-109492, the three-dimensional shape of a sample is measured using the fringe image.

In the apparatus of Japanese Patent Application Laid-open No. 2008-20498, a phenomenon in which an image contrast is higher in front or at back of the focus position than at the focus position is utilized. This phenomenon is caused by interference between non-diffracted light and diffracted light. In the apparatus of Japanese Patent Application Laid-open No. 2008-20498, a differential image is obtained from images in front or at back of the focus position. Then, the contrast value of the differential image is calculated, and the position where the contrast value is largest is set as the focus position. In the apparatus of Japanese Patent Application Laid-open No. 2008-20498, by detecting the focus position for each position of the sample surface, it is possible to measure the three-dimensional shape of a sample.

SUMMARY OF THE INVENTION

A sample shape measuring method according to the present invention comprises:
a step of preparing illumination light passing through a predetermined illumination region;
a step of applying the illumination light to a sample; and
a predetermined processing step, wherein
the predetermined illumination region is set so as not to include an optical axis at a pupil position of an illumination optical system and is set such that the illumination light is applied to part of inside of a pupil and outside of the pupil at a pupil position of an observation optical system,
a light intensity of the illumination light incident on the predetermined illumination region differs between a center and a periphery;
the illumination light is transmitted through the sample, light transmitted through the sample is incident on the observation optical system, and
the predetermined processing step includes:
a step of receiving light transmitted through the observation optical system;
a step of obtaining a quantity of light of the received light;
a step of calculating a difference or a ratio between the quantity of light and a reference quantity of light; and
a step of calculating an amount of tilt in a surface of the sample from the difference or the ratio.

A sample shape measuring apparatus according to the present invention comprises:
an illumination optical system; an observation optical system; a holding member; a detecting element; and a processing apparatus, wherein
the illumination optical system includes a light source, a condenser lens, and an aperture member,
the observation optical system includes an objective lens and an imaging lens,
the holding member holds a sample and is disposed between the illumination optical system and the observation optical system,
the aperture member has a light-shielding part and an opening,
the light-shielding part is provided so as to include an optical axis of the condenser lens,
the opening is provided at a position eccentric with respect to the optical axis,
an image of the opening is formed in vicinity of a pupil position of the observation optical system and is formed so as to overlap part of an outer edge of a pupil of the observation optical system,
a light intensity of the illumination light incident on the aperture member differs between a center and a periphery in a plane perpendicular to the optical axis,
illumination light applied to the sample by the illumination optical system is transmitted through the sample,
light transmitted through the sample is incident on the observation optical system,
the detecting element receives light transmitted through the observation optical system, and
the processing apparatus
obtains a quantity of light based on the received light,
calculates a difference or a ratio between the quantity of light and a reference quantity of light, and
calculates an amount of tilt in a surface of the sample based on the difference or the ratio.

DETAILED DESCRIPTION OF THE INVENTION

Embodiments and examples of a sample shape measuring method and sample shape measuring apparatus will be described below in detail by referring to the accompanying diagrams. However, the present invention is not restricted to the embodiments and the examples described below.

First of all, the principle of measurement in a sample shape measuring method of the present embodiment will be described. In the sample shape measuring method of the present embodiment, oblique illumination light is applied to a sample. For this purpose, a light-shielding member for shielding part of light flux of illumination light is used in the stop (aperture stop) of the illumination optical system.

Figure 1:
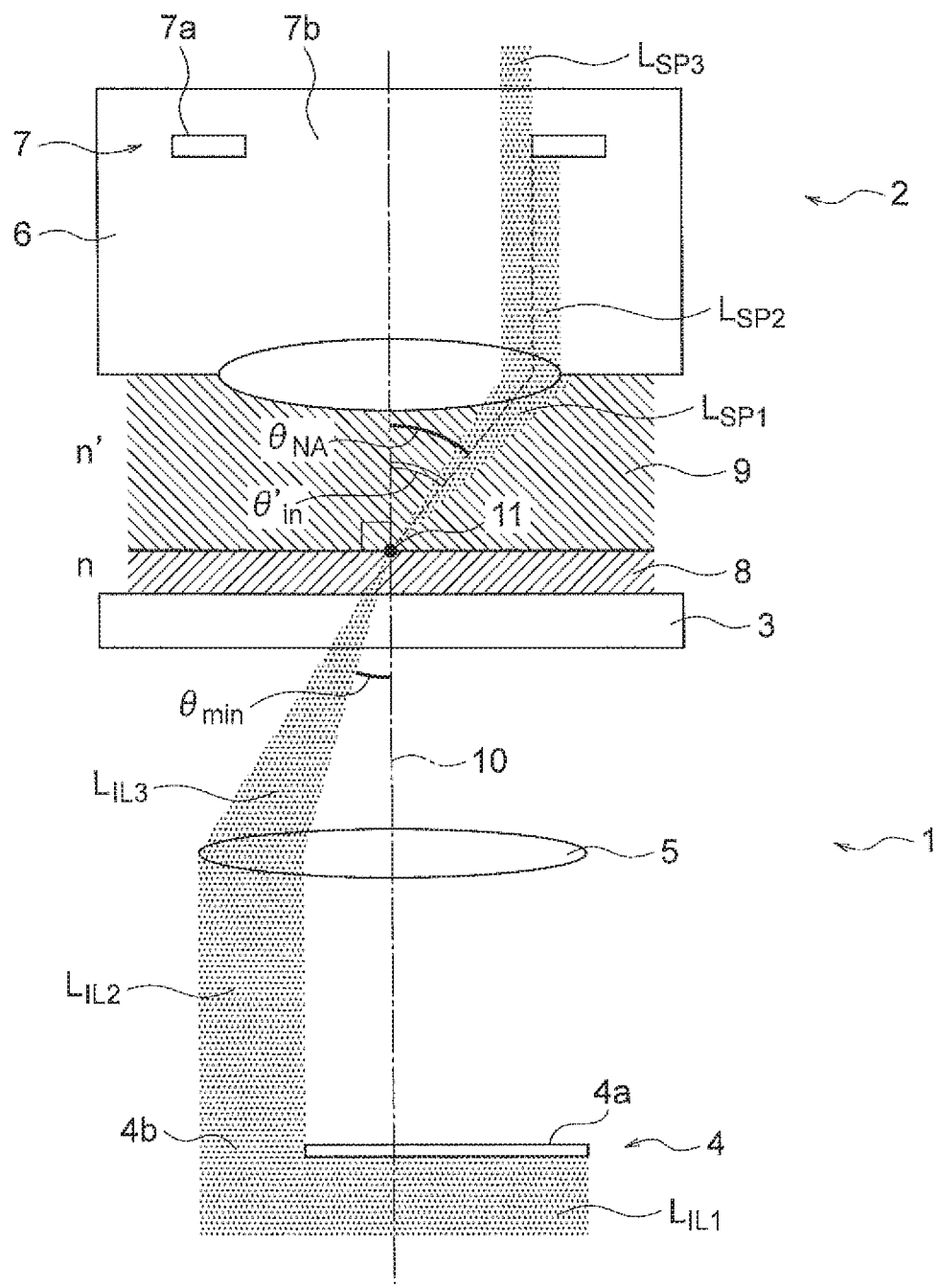
FIG. 1 is a diagram showing a state of illumination light and a state of imaging light in a first state.

First, the relation between illumination light and imaging light in a first state will be described. The state of illumination light and the state of imaging light in the first state are shown in FIG. 1. In the first state, the surface of a sample is flat, and the normal to the surface of the sample (hereinafter referred to as "normal to the surface") is parallel to the optical axis.

As shown in FIG. 1, an illumination optical system 1 and an observation optical system 2 are disposed to be opposed to each other with a stage 3 interposed therebetween. The illumination optical system 1 includes a light-shielding member 4 and a condenser lens 5. The observation optical system 2 includes an objective lens 6. The objective lens 6 has a stop 7.

For the light-shielding member 4, for example, a rectangular metal plate is used. The light-shielding member 4 is composed of a light-shielding region 4a and a transmission region 4b. The light-shielding region 4a is formed of a metal plate. Nothing exists in the transmission region 4b.

The light-shielding member 4 is disposed so as to include an optical axis 10. Therefore, the optical axis 10 is included in the light-shielding region 4a whereas the optical axis 10 is not included in the transmission region 4b. The transmission region 4b is formed at a position away from the optical axis 10.

Since the light-shielding member 4 is disposed in the optical path, illumination light $L_{IL1}$ is divided into light shielded by the light-shielding region 4a and light transmitted through the transmission region 4b.

For the light-shielding member 4, a transparent plate may be used. In this case, the light-shielding region 4a is formed, for example, by applying light-shielding paint or adhesion of a light-shielding member. On the other hand, application of light-shielding paint or affixing of a light-shielding member is not performed in the transmission region 4b. Therefore, the transparent plate alone exists in the transmission region 4b.

The shape of the light-shielding member 4 may not be rectangular. For example, the shape of the light-shielding member 4 may be circular, oval, or polygonal.

The stop 7 has a light-shielding part 7a and a transmission part 7b. For the stop 7, for example, a circular metal plate or transparent plate is used. When a metal plate is used for the stop 7, the light-shielding part 7a is a metal plate and the transmission part 7b is a hole formed in the metal plate. When a transparent plate is used for the stop 7, the light-shielding part 7a is formed by application of light-shielding paint or affixing of a light-shielding member. The transparent plate alone exists in the transmission part 7b.

The stop 7 is optically equivalent to the pupil of the objective lens 6. Therefore, at this position, a member that limits passage of light flux, for example, the above-noted metal plate or transparent plate may not exist.

A sample 8 is placed on the stage 3. A liquid immersion medium 9 (hereinafter referred to as "immersion liquid 9") fills in between the sample 8 and the objective lens 6. Here, the sample 8 is a liquid having a refractive index of n, and the immersion liquid 9 is a liquid having a refractive index of n'. Furthermore, n>n' holds.

Illumination light $L_{IL1}$ is parallel light flux and formed such that the optical axis 10 is included in the light flux. Illumination light $L_{IL1}$ travels through the optical path of the illumination optical system 1 toward the sample 8. In the optical path of the illumination optical system 1, the light-shielding member 4 and the condenser lens 5 are disposed.

Figure 2A:
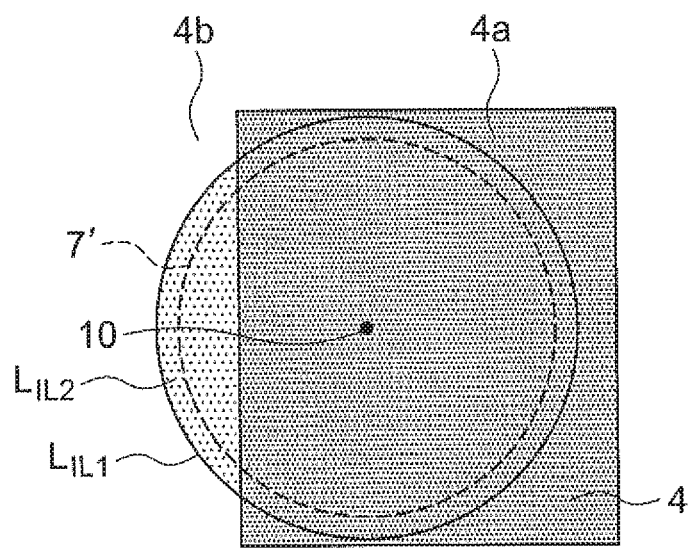
FIG. 2A is a diagram showing a state of illumination light in the first state.

The state of illumination light in the first state is shown in FIG. 2A. In FIG. 2A, a region of illumination light $L_{IL1}$ is shown by a circle of a solid line. Illumination light $L_{IL1}$ is divided into light shielded by the light-shielding region 4a and light transmitted through the transmission region 4b. The light-shielding member 4 is disposed such that the light-shielding region 4a includes the optical axis 10. Thus, the optical axis 10 is not included in the transmission region 4b. When passing through the transmission region 4b, the region of illumination light $L_{IL2}$ is formed into a bow-like shape.

The light-shielding member 4 is conjugate to the stop 7 by the condenser lens 5 and the objective lens 6. Therefore, an image 7' of the stop is formed at the position of the light-shielding member 4. In FIG. 2A, the image 7' of the stop formed at the position of the light-shielding member 4 is shown by a dashed line. The image 7' of the stop is a circular image as shown by the dashed line. The image 7' of the stop is also the image of the pupil of the objective lens 6.

As shown in FIG. 2A, the circle shown by a solid line is larger than the circle shown by a dashed line. This means that the light flux diameter of illumination light $L_{IL1}$ is set so as to illuminate a range wider than the image 7' of the stop. The same thing can be said for illumination light $L_{IL2}$. That is, illumination light $L_{IL2}$ is set to such a size that is distributed to the outside of the image 7' of the stop.

Returning to FIG. 1, the description will continue. Illumination light $L_{IL2}$ passing through the transmission region 4b is incident on the condenser lens 5. Since illumination light $L_{IL2}$ travels through a position away from the optical axis 10, illumination light $L_{IL2}$ is incident on the periphery of the condenser lens 5.

Illumination light $L_{IL2}$ incident on the condenser lens 5 is refracted by the condenser lens 5. From the condenser lens 5, illumination light $L_{IL3}$ is transmitted. Illumination light $L_{IL3}$ is incident on an observation point 11 on the sample 8 whereby the observation point 11 is illuminated.

At the observation point 11, illumination is performed such that illumination light $L_{IL3}$ intersects the optical axis 10. This means that illumination by illumination light deflected in a certain direction, that is, illumination by oblique illumination light is performed.

Illumination light $L_{IL3}$ is transmitted through the sample 8. Light transmitted through the sample 8 (hereinafter referred to as "imaging light") reaches the objective lens 6. Of imaging light $L_{SP1}$ that reaches the objective lens 6, part of the imaging light is shaded by the effective aperture of the objective lens 6 and the remaining imaging light is incident on the objective lens 6. Of imaging light $L_{SP2}$ incident on the objective lens 6, part of the imaging light is shaded by the stop 7 and the remaining imaging light $L_{SP3}$ is transmitted through the objective lens 6.

Figure 2B:
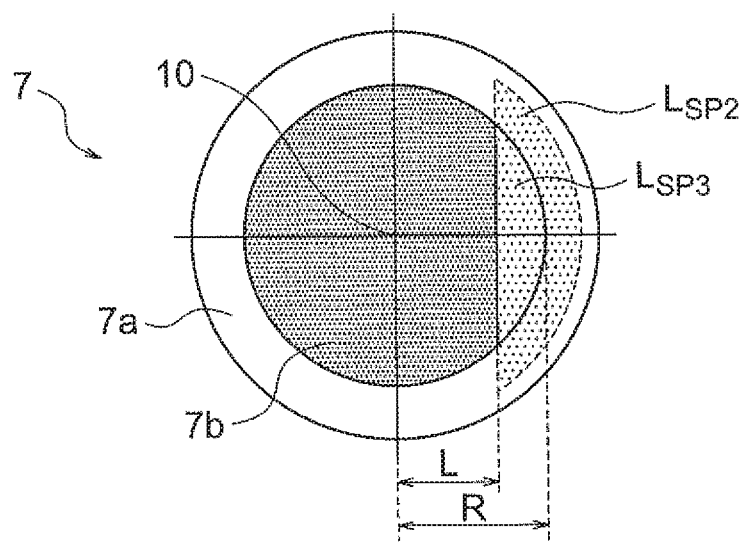
FIG. 2B is a diagram showing a state of imaging light in the first state.

The state of the imaging light in the first state is shown in FIG. 2B. Imaging light $L_{SP2}$ is incident on the stop 7. The region indicating imaging light $L_{SP2}$ is bow-shaped. Of imaging light $L_{SP2}$, part of the imaging light is located outside the transmission part 7b. Therefore, this part of the imaging light is shielded by the light-shielding part 7a. Of imaging light $L_{SP2}$, the remaining imaging light passes through the transmission part 7b.

The imaging light $L_{SP2}$ is divided into a region where the imaging light passes through and a region where the imaging light does not exist. The region where the imaging light passes through is bow-shaped. Imaging light $L_{SP3}$ passes through this bow-shaped region.

In FIG. 2B, R denotes the radius of the transmission part 7b. Since the stop 7 is optically equivalent to the pupil of the objective lens 6, it can be said that R represents the radius of the pupil of the objective lens. L denotes the shortest distance of the distance from the optical axis 10 to imaging light $L_{SP3}$.

In the first state, Equation (1) below holds for predetermined light rays. The predetermined light rays are light rays passing through the position closest to the optical axis, of light incident on the sample.

$$\theta'_{in} = \sin^{-1}\left(\frac{n}{n'}\sin\theta_{min}\right) \quad (1)$$

where $\theta'_{in}$ is the angle formed between the predetermined light rays and a normal to the surface of the sample, $\theta_{min}$ is the angle formed between the predetermined light rays and the optical axis on the illumination optical system side, n is the refractive index of the sample, and n' is the refractive index of the immersion liquid.

Here, an area $S_0$ of the imaging light transmitted through the objective lens is represented by Equation (2) below.

$$S_0 = R^2 \cos^{-1}\left(\frac{L}{R}\right) - L^2 \tan\left(\cos^{-1}\left(\frac{L}{R}\right)\right) \quad (2)$$

Furthermore, R and L are represented by Equations (3) and (4) below, respectively.

$$R = f \tan\theta_{NA} \quad (3)$$

$$L = f \tan\theta'_{in} = f \tan\left[\sin^{-1}\left(\frac{n}{n'} \sin\theta_{min}\right)\right] \quad (4)$$

where
f is the focal length of the objective lens, and
$\sin\theta_{NA}$ is the numerical aperture on the sample side of the objective lens.

Figure 3:
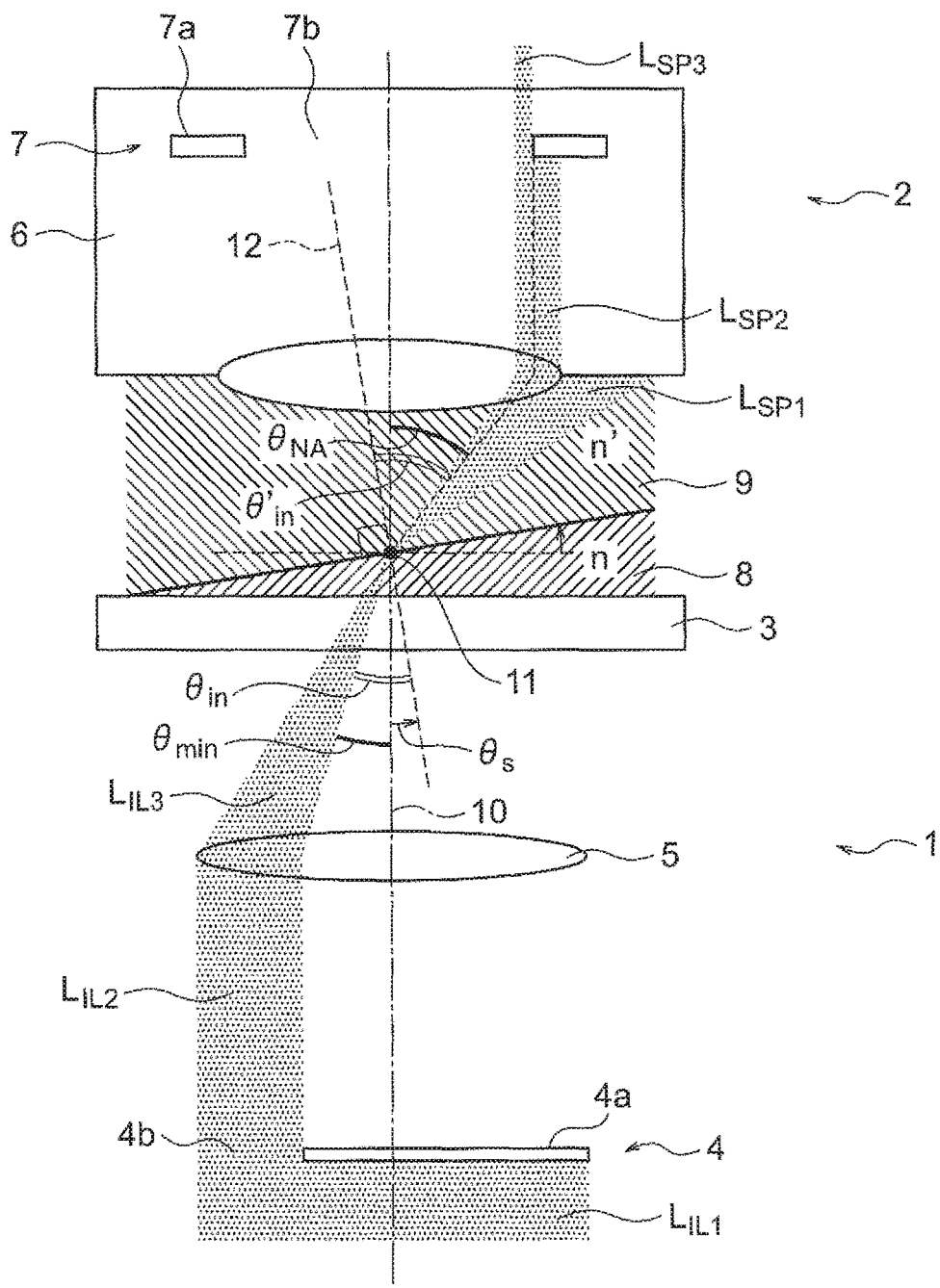
FIG. 3 is a diagram showing a state of illumination light and a state of imaging light in a second state.

Next, the relation between illumination light and imaging light in the second state will be described. The state of illumination light and the state of imaging light in the second state are shown in FIG. 3. In the second state, the surface of the sample is flat whereas the normal to the surface is non-parallel to the optical axis.

In a state in which the normal to the surface is non-parallel to the optical axis, the surface of the sample is inclined. As shown in FIG. 3, since the angle formed between the normal to the surface 12 and the optical axis 10 is $\theta_s$, it follows that the surface of the sample 8 is inclined by an inclination angle $\theta_s$. It is assumed that the angle is positive when the normal to the surface 12 is positioned in a counter-clockwise direction with respect to the optical axis 10, and the angle is negative when the normal to the surface 12 is positioned in a clockwise direction. In the second state, $\theta_s$ is a positive value.

Light transmitted through the sample 8 reaches the objective lens 6. Of imaging light $L_{SP1}$ that reaches the objective lens 6, part of the imaging light is shaded by the effective aperture of the objective lens 6 and the remaining imaging light is incident on the objective lens 6.

Here, in the second state, the surface of the sample 8 is inclined by an inclination angle $+\theta_s$. In this case, the angle of refraction at the surface of the sample 8 is large. Thus, the position of imaging light $L_{SP1}$ incident on the objective lens 6 is shifted in a further outside direction compared with the first state. As a result, the size of light flux of imaging light $L_{SP2}$ incident on the objective lens 6 is smaller compared with the first state.

Of imaging light $L_{SP2}$ incident on the objective lens 6, part of the imaging light is shaded by the stop 7 and the remaining imaging light $L_{SP3}$ is transmitted through the objective lens 6. Since the size of light flux of imaging light $L_{SP2}$ is smaller compared with the first state, the size of light flux of imaging light $L_{SP3}$ is also smaller compared with the first state.

Figure 4A:
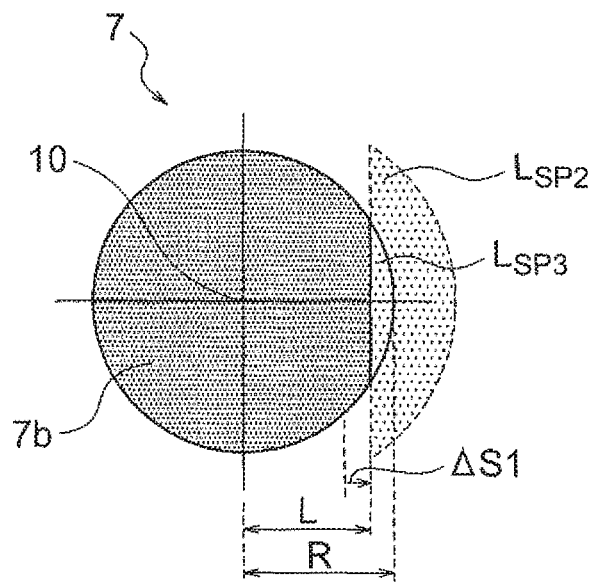
FIG. 4A is a diagram showing a state of illumination light in the second state.
Figure 4B:
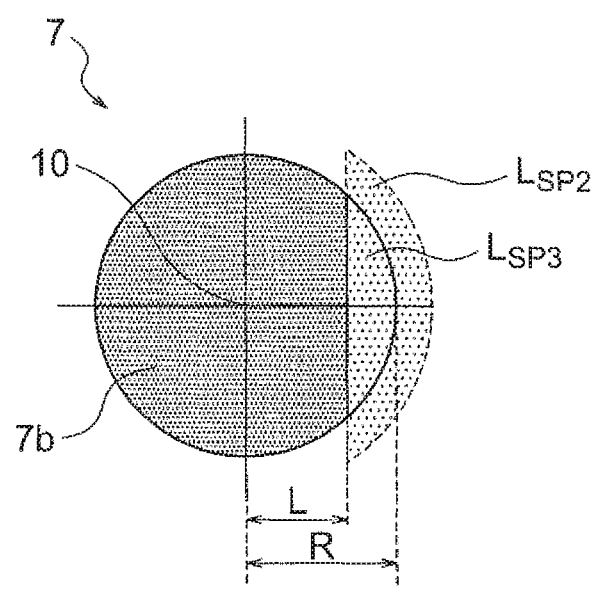
FIG. 4B is a diagram showing a state of imaging light in the second state.

The state of imaging light in the second state is shown in FIG. 4A. Furthermore, for the purpose of comparison, the state of imaging light in the first state is shown in FIG. 4B. In FIG. 4A and FIG. 4B, the light-shielding part 7a is not depicted.

As can be understood from the comparison between FIG. 4A and FIG. 4B, light flux of imaging light $L_{SP3}$ in the second state is shifted by $\Delta S1$ in a direction further away from the optical axis 10 than the position of light flux of imaging light $L_{SP3}$ in the first state. Thus, the size of light flux of imaging light $L_{SP3}$ in the second state is smaller compared with the first state. Therefore, in the second state, the quantity of light passing through the stop 7 decreases from the first state.

Figure 5:
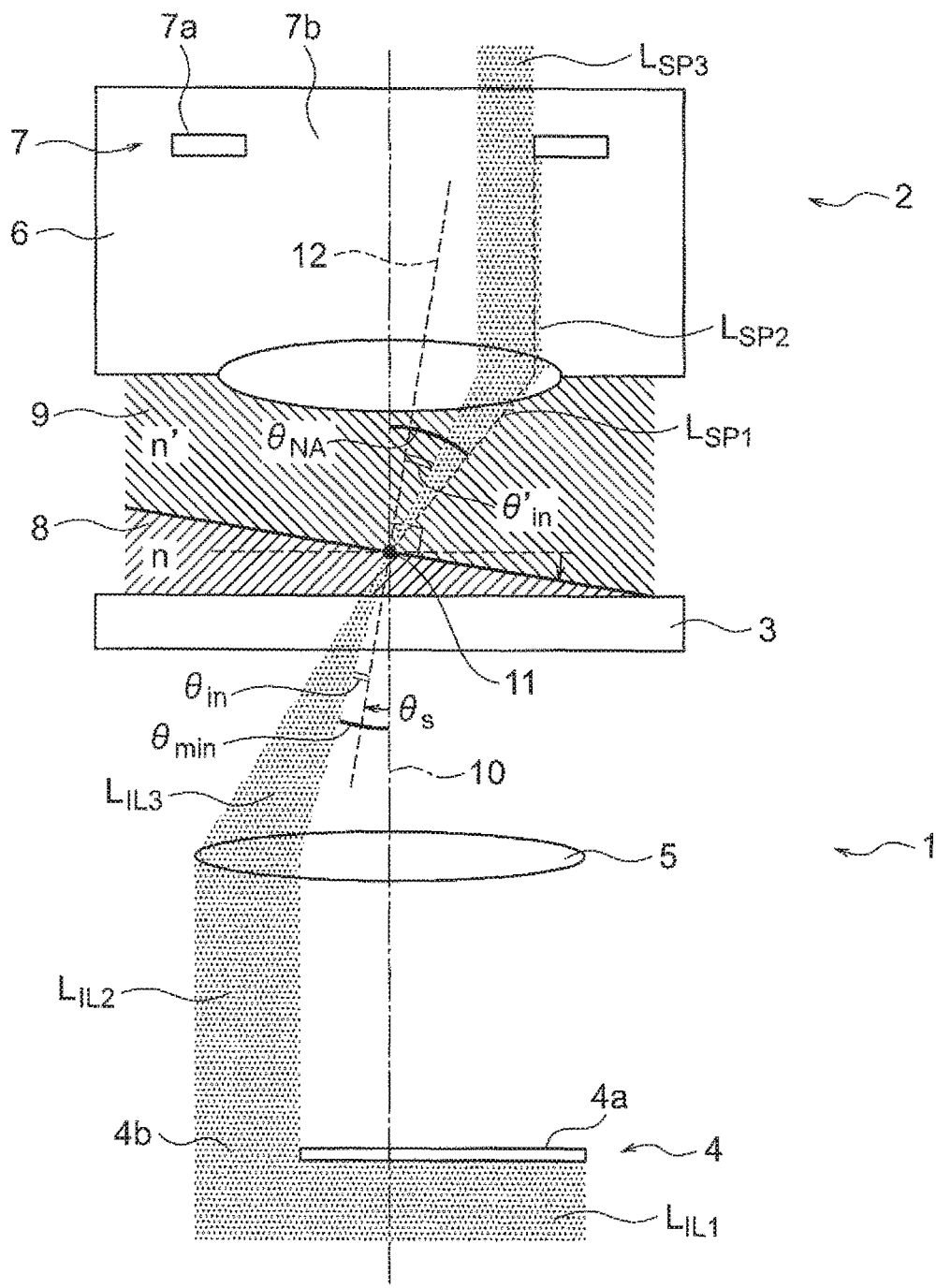
FIG. 5 is a diagram showing a state of illumination light and a state of imaging light in a third state.

Next, the relation between illumination light and imaging light in the third state will be described. The state of illumination light and the state of imaging light in the third state are shown in FIG. 5. In the third state, the surface of the sample is flat whereas the normal to the surface is non-parallel to the optical axis.

Also in the third state, the normal to the surface is non-parallel to the optical axis. As shown in FIG. 5, since the angle formed between the normal 12 and the optical axis 10 is $\theta_s$, it follows that the surface of the sample 8 is inclined by an inclination angle $\theta_s$. However, unlike the second state, $\theta_s$ is a negative value in the third state.

Light transmitted through the sample 8 reaches the objective lens 6. Of imaging light $L_{SP1}$ that reaches the objective lens 6, part of the imaging light is shaded by the effective aperture of the objective lens 6 and the remaining imaging light is incident on the objective lens 6.

Here, in the third state, the surface of the sample 8 is inclined by an inclination angle $-\theta_s$. In this case, the angle of refraction at the surface of the sample 8 is small. Thus, the position of imaging light $L_{SP1}$ incident on the objective lens 6 is shifted in a further inside direction compared with the first state. As a result, the size of light flux of imaging light $L_{SP2}$ incident on the objective lens 6 is larger compared with the first state.

Of imaging light $L_{SP2}$ incident on the objective lens 6, part of the imaging light is shaded by the stop 7 and the remaining imaging light $L_{SP3}$ is transmitted through the objective lens 6. Since the size of light flux of imaging light $L_{SP2}$ is larger compared with the first state, the size of light flux of imaging light $L_{SP3}$ is also larger compared with the first state.

Figure 6A:
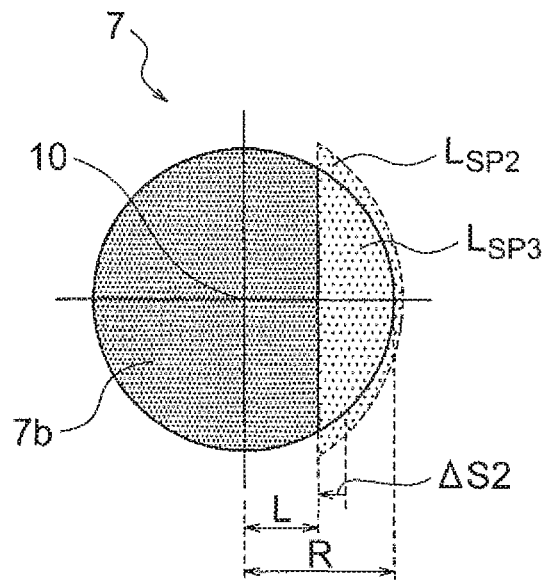
FIG. 6A is a diagram showing a state of illumination light in the third state.
Figure 6B:
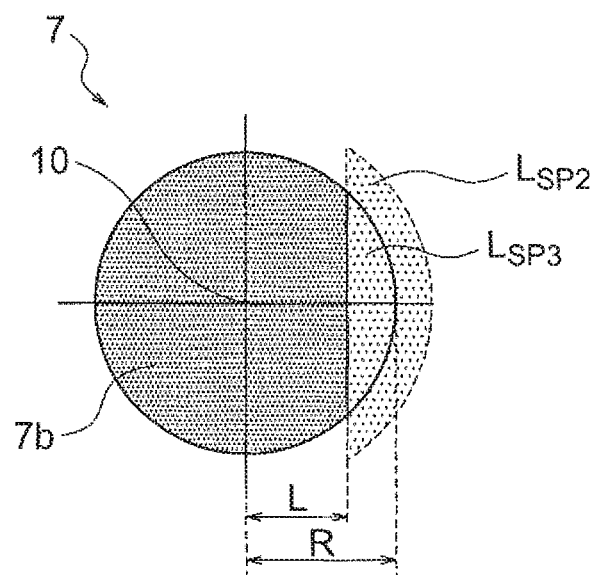
FIG. 6B is a diagram showing a state of imaging light in the third state.

The state of imaging light in the third state is shown in FIG. 6A. Furthermore, for the purpose of comparison, the state of imaging light in the first state is shown in FIG. 6B. In FIG. 6A and FIG. 6B, the light-shielding part 7a is not depicted.

As can be understood from comparison between FIG. 6A and FIG. 6B, the light flux of imaging light $L_{SP3}$ in the third state is shifted by $\Delta S2$ in a direction closer to the optical axis 10 from the position of light flux of imaging light $L_{SP3}$ in the first state. Thus, the size of light flux of imaging light $L_{SP3}$ in the third state is larger compared with the first state. Therefore, in the third state, the quantity of light passing through the stop 7 increases from the first state.

In the second state and the third state, Equation (5) below holds for predetermined light rays.

$$\theta'_{in} - \theta_s = \sin^{-1}\left(\frac{n}{n'} \sin\theta_{in}\right) - \theta_s \quad (5)$$

where
$\theta'_{in}$ is the angle formed between the predetermined light rays and the normal to the surface of the sample,
$\theta_s$ is the angle formed between the normal to the surface of the sample and the optical axis,
$\theta_{min}$ is the angle formed between the predetermined light rays and the optical axis on the illumination optical system side, n is the refractive index of the sample, n' is the refractive index of the immersion liquid, and the angle is positive when the normal to the surface of the sample is positioned in a counter-clockwise direction with respect to the optical axis, and the angle is negative when the normal to the surface of the sample is positioned in a clockwise direction with respect to the optical axis.

For example, when the sample is inclined in the direction shown in FIG. 3, the rotation direction of the normal to the surface is a positive direction and $\theta_s$ has a positive value. On the other hand, when the sample is inclined in the direction shown in FIG. 5, the rotation direction of the normal to the surface is a negative direction and $\theta_s$ has a negative value.

Here, the area S of the imaging light transmitted through the objective lens is represented by Equation (6) below.

$$S = R^2 \cos^{-1}\left(\frac{L}{R}\right) - L^2 \tan\left(\cos^{-1}\left(\frac{L}{R}\right)\right) \quad (6)$$

where R is represented by Equation (3) above and L is represented by Equation (7) below.

$$L = f \tan(\theta'_{in} - \theta_s) = f \tan\left[\sin^{-1}\left(\frac{n}{n'}\sin\theta_{in}\right) - \theta_s\right] \quad (7)$$

In Equation (7), if $\theta in=\theta min$ and $\theta s=0$, then the right side of Equation (7) is the same as the right side of Equation (4). In this case, the right side of Equation (6) is also the same as the right side of Equation (2). Therefore, the area S and the inclination angle $\theta_s$ can be represented by Equations (3), (6), and (7).

Figure 7:
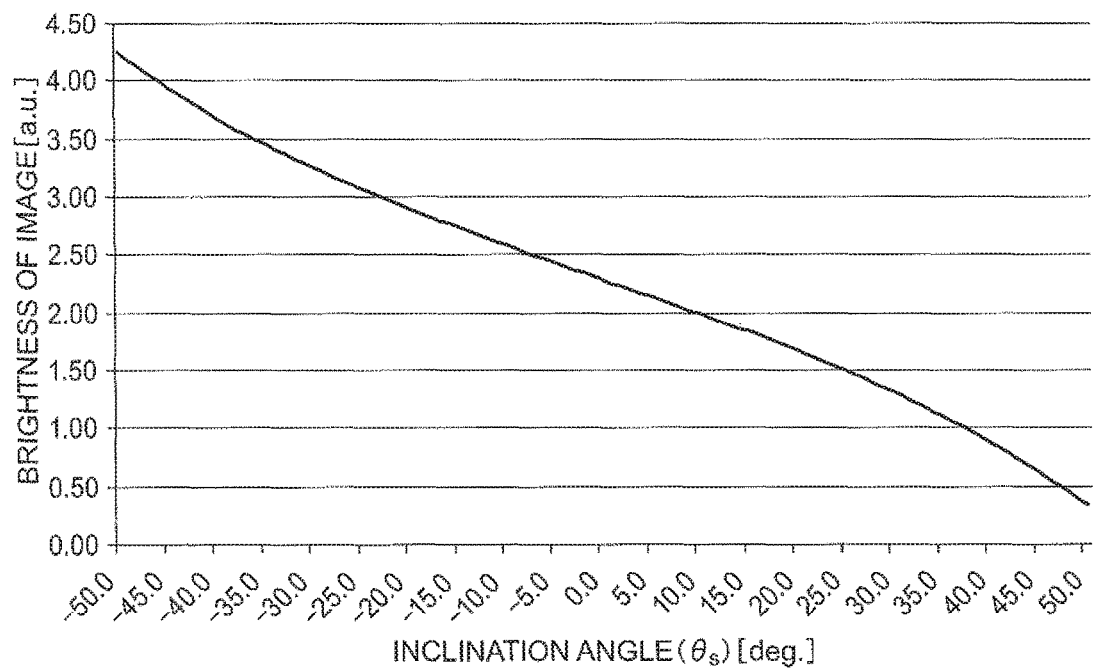
FIG. 7 is a graph showing the relation between inclination angle $\theta_s$ and area S.

The graph representing the relation between the inclination angle $\theta_s$ and the area S is shown in FIG. 7. The imaging light transmitted through the objective lens is collected, for example, by an imaging lens. At the light-collecting position, an image of the sample 8 is formed. When the area S of the imaging light transmitted through the objective lens changes, the brightness of the image of the sample 8 changes. Furthermore, when the inclination angle $\theta_s$ changes, the tilt angle of the surface of the sample relative to the optical axis changes. Then, in the graph shown in FIG. 7, the tilt angle is replaced by the inclination angle $\theta_s$ and the brightness of the image is replaced by the area S to show the relation between the tilt angle and the brightness of the image.

Furthermore, the values of the parameters are as follows.

n'=1.33, n=1.35, f=18 [mm], $\theta_{NA}$=9.2 [deg.] (NA=0.16), $\theta_{min}$=6.5 [deg.]

As can be understood from the curve representing the relation between the inclination angle $\theta_s$ and the area S (hereinafter referred to as "characteristic curve"), as the value of the inclination angle $\theta_s$ increases, the brightness of the image decreases monotonously. In this way, the brightness of the image and the inclination angle $\theta_s$ are in one-to-one correspondence.

Then, illumination light deflected in a certain direction is applied to a sample, and a two-dimensional image of the sample is obtained. Then, information of the quantity of light (brightness) is obtained for each pixel of the obtained two-dimensional image. Here, the refractive index (average refractive index) n of the sample, the refractive index n' of the immersion liquid, the focal length f of the objective lens, the numerical aperture $\theta_{NA}$ on the sample side of the objective lens, and the angle $\theta_{min}$ are known. Therefore, they can be used to derive the inclination angle $\theta_s$ for each pixel. That is, it is possible to derive the distribution of the amount of tilt in the surface of the sample.

In this way, in the principle of measurement in the sample shape measuring method of the present embodiment, illumination light deflected in a certain direction is merely applied to a sample. Thus, in derivation of the distribution of the amount of tilt in the surface of the sample, light transmitted through the sample, that is, light transmitted through the sample is merely utilized, and the contrast of an image or the interference between non-diffracted light and diffracted light is not utilized. Therefore, according to the sample shape measuring method of the present embodiment, even for a sample in which the reflectance of the surface is low and the surface shape is smooth, it is possible to measure the amount of tilt in the surface of the sample with high accuracy. Furthermore, it is possible to measure the surface shape of the sample with high accuracy by using the measured amount of tilt.

A sample shape measuring method of the present embodiment will be described. In the following description, the pupil 7 of the objective lens is used in place of the stop 7.

The sample shape measuring method of the present embodiment includes a step of preparing illumination light passing through a predetermined illumination region, a step of applying the illumination light to a sample, and a predetermined processing step. The predetermined illumination region is set so as not to include an optical axis at a pupil position of an illumination optical system and is set such that illumination light is applied to part of the inside of the pupil and the outside of the pupil at a pupil position of an observation optical system. A light intensity of the illumination light incident on the predetermined illumination region differs between a center and a periphery. The illumination light is transmitted through the sample. The light transmitted through the sample is incident on the observation optical system. The predetermined processing step includes a step of receiving the light transmitted through the observation optical system, a step of obtaining the quantity of light of the received light, a step of calculating the difference or the ratio between the quantity of light and a reference quantity of light, and a step of calculating the amount of tilt in a surface of the sample from the difference or the ratio.

Figure 8:
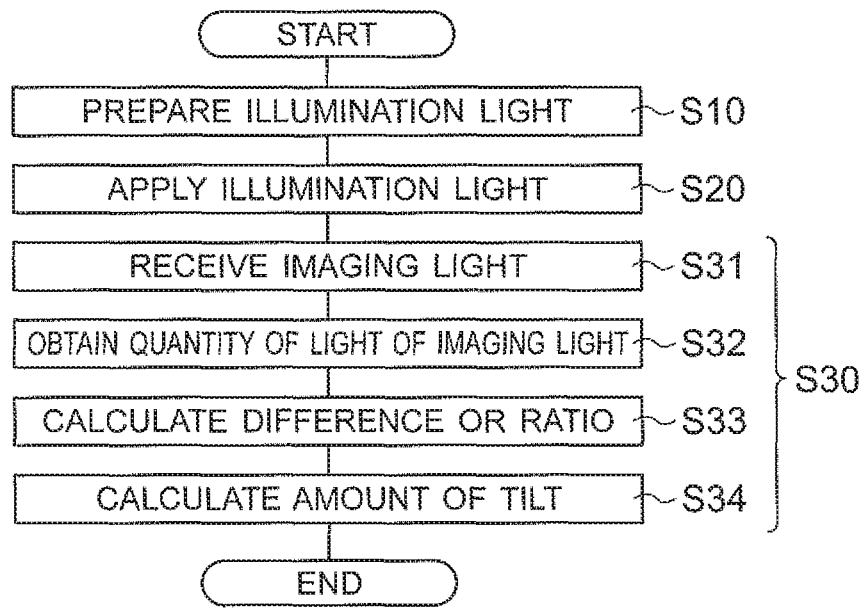
FIG. 8 is a flowchart of a sample shape measuring method according to the present embodiment.

FIG. 8 is a flowchart of the sample shape measurement method of the present embodiment. The sample shape measurement method of the present embodiment includes step S10 of preparing illumination light, step S20 of applying the illumination light, and predetermined processing step S30. The predetermined processing step S30 includes step S31 of receiving imaging light, step S32 of obtaining the quantity of light of the imaging light, step S33 of calculating the difference or the ratio, and step S34 of calculating the amount of tilt.

In the sample shape measurement method of the present embodiment, first of all, step S10 is executed. Step S10 is a step of preparing illumination light. In step S10, a predetermined illumination region is set in the illumination optical system. The predetermined illumination region is a region where illumination light passes through. The predetermined illumination region is the transmission region 4b shown in FIG. 1. The predetermined illumination region is set by disposing the light-shielding member 4 in the optical path of the illumination optical system 1. Here, the light-shielding member 4 is disposed so as to include the optical axis 10 and to shield part of light flux of illumination light $L_{IL1}$.

Furthermore, the light-shielding member 4 is disposed at the pupil position of the illumination optical system 1, specifically, the pupil position of the condenser lens 5. The position of the pupil of the condenser lens 5 is conjugate to the pupil position of the observation optical system 2, specifically, the position of the pupil 7 of the objective lens. Therefore, an image of the predetermined illumination region is formed at the position of the pupil 7 of the objective lens. Here, the image of the predetermined illumination region is formed so as to be distributed in both the inside and the outside of the pupil 7 of the objective lens.

In this way, the predetermined illumination region is set at the pupil position of the illumination optical system so as not to include the optical axis and is set such that the illumination light passing through the predetermined illumination region is applied to part of the inside of the pupil and the outside of the pupil at the pupil position of the observation optical system.

When step S10 is finished, step S20 is executed. Step S20 is a step of applying illumination light. In step S20, illumination light is applied to a sample. Here, oblique illumination light is applied to a sample. That is, illumination light is applied to a sample such that light flux intersects the optical axis at the sample position, and is transmitted through the sample. The sample is illuminated whereby imaging light is transmitted through the sample. The light transmitted through the sample is incident on the observation optical system.

When step S20 is finished, step S30 is executed. Step S30 is a step of performing predetermined processing. In step S30, step S31, step S32, step S33, and step S34 are executed.

In step S30, first, step S31 is executed. Step S31 is a step of receiving imaging light. The imaging light is the light transmitted through the observation optical system.

When step S31 is finished, step S32 is executed. Step S32 is a step of obtaining the quantity of light of the imaging light. The quantity of light of the imaging light is the quantity of light received in step S31.

When step S32 is finished, step S33 is executed. Step S33 is a step of calculating the difference or the ratio. In step S33, the difference or the ratio between the quantity of light received in step S31, that is, the quantity of light of the imaging light and a reference quantity of light is calculated.

When step S33 is finished, step S34 is executed. Step S34 is a step of calculating the amount of tilt. In step S34, the amount of tilt in the surface of the sample is calculated from the result of calculation in step S33.

In the step of calculating the amount of tilt, it is possible to calculate the amount of tilt based on a correspondence relation obtained in advance.

The correspondence relation may be represented by a lookup table including the quantity of light and the amount of tilt as parameters. In step S33, the difference or the ratio between the quantity of light of the imaging light and the reference quantity of light is calculated. The calculated value represents the quantity of light of the imaging light. Then, the brightness in the lookup table is searched for the value matching the calculated value. If the value matching the calculated value is found, the inclination angle corresponding to the found value is obtained from the lookup table. Thus, it is possible to quickly obtain the amount of tilt in the surface of the sample.

On the other hand, the value matching the calculated value may not exist in the lookup table. In this case, two values closest to the calculated value are extracted from among the brightness in the lookup table. Then, the inclination angle is obtained using the extracted two values. Thus, it is possible to obtain the amount of tilt in the surface of the sample.

Moreover the correspondence relation may be represented by an expression including the quantity of light and the amount of tilt as parameters. As described above, the area S of the imaging light transmitted through the objective lens and the inclination angle $\theta_s$ are represented by Equations (3), (6), and (7). The area S represents the quantity of light of the imaging light, and the inclination angle $\theta_s$ represents the amount of tilt in the surface of the sample.

In step S33, the difference or the ratio between the quantity of light of the imaging light and the reference quantity of light is calculated. The calculated value represents the quantity of light of the imaging light. Then, the inclination angle $\theta_s$ is obtained by substituting the calculated value into the area S. By doing this, it is possible to obtain the amount of tilt in the surface of the sample.

As described above, in the sample shape measuring method of the present embodiment, a light intensity of illumination light incident on the predetermined illumination region differs between a center and a periphery.

In many light sources, alight intensity of light emitted from the light source differs between the center and the periphery. The light emitted from the light source is converted into illumination light having a desired light flux diameter by the illumination optical system. Then, by doing as described above, it is possible to basically form the illumination optical system merely of lenses. As a result, it is possible to easily prepare illumination light.

In this way, in a present shape measurement method, illumination light deflected in a certain direction is merely applied to a sample. Thus, in derivation of the distribution of the amount of tilt in the surface of the sample, light transmitted through the sample, that is, light transmitted through the sample is merely utilized, and the contrast of an image or the interference between non-diffracted light and diffracted light is not utilized. Therefore, according to the sample shape measuring method of the present embodiment, it is possible to prepare illumination light easily, and even for a sample in which the reflectance of the surface is low and the surface shape is smooth, it is possible to measure the amount of tilt in the surface of the sample with high accuracy. Furthermore, as will be described later, by using the measured amount of tilt, it is possible to measure the surface shape of the sample with high accuracy.

A preferred embodiment will be described hereinafter. In the following description, there are cases where explanation is made using an aperture member. In this case, the aperture member, the light-shielding part, and then opening described above correspond to the light-shielding member, the light-shielding region, and the transmission region, respectively.

In the sample shape measuring method of the present embodiment, it is preferable that a light intensity distribution of illumination light incident on the predetermined illumination region be distributed axisymmetrically.

It is possible that the predetermined illumination region, for example, the transmission region 4b shown in FIG. 1 is positioned on a circumference with the optical axis 10 serving as a center. Thus, by setting the light intensity distribution of illumination light axisymmetrical, the light intensity distribution in the predetermined illumination region is the same, no matter where on the circumference the transmission region 4b is located. Therefore, the same measurement result is obtained, no matter where on the circumference the transmission region 4b is located. As a result, it is possible that the amount of tilt of the surface of the sample is measured quickly and with high reproducibility. Moreover, as described later, by using the measured amount of tilt, it is possible to measure the shape of the surface of the sample quickly and with high reproducibility.

The axisymmetrical light intensity distribution is a distribution obtained when a light intensity distribution in a cross section including the optical axis 10 is rotated with the optical axis 10 serving as a rotation axis. In this case, the light intensity distribution in the light flux passing through the pupil 7 of the objective lens is the same no matter where on the circumference the transmission region 4b is located. Accordingly, the same measurement result is obtained no matter where on the circumference the transmission region 4b is located.

Moreover, when the amount of tilt in the surface of the sample is obtained using the lookup table described above, it is possible to set the number of the lookup table to one.

In the sample shape measuring method of the present embodiment, it is preferable that light transmitted through the observation optical system be light passing through the light flux transmission region, the light flux transmission region be a region surrounded by an external boundary line and a first boundary line, the external boundary line be formed of part of an outer edge of the observation optical system, and the first boundary line be formed of a line parallel with a straight line orthogonal to the optical axis.

In the case where measurement is performed using the sample shape measuring method of the present embodiment, in the sample shape measuring apparatus of the present embodiment, it is preferable that the aperture member have a boundary line dividing the light-shielding part and the opening, and the boundary line be formed of a line parallel with a straight line orthogonal to the optical axis.

By doing this, it is possible to manufacture the aperture member easily. The light flux transmission region, and boundary lines, such as the external boundary line and the first boundary line, will be described later.

In the sample shape measuring method of to the present embodiment, it is preferable that a light intensity of illumination light incident on the predetermined illumination region be smaller from a center toward a periphery of the light flux.

Figure 9:
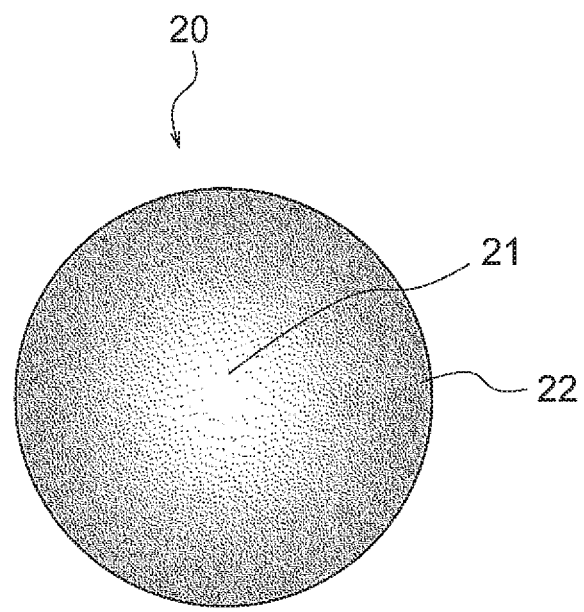
FIG. 9 is a diagram illustrating a light intensity distribution of the illumination light.

FIG. 9 is a diagram illustrating a light intensity distribution of illumination light. Illumination light 20 is illumination light having a non-uniformly distributing light intensity. Directly before incidence on the aperture member, the shape of the illumination light 20 is circular.

In the illumination light 20, the light intensity differs between a center 21 of light flux and a periphery 22 of the light flux. The light intensity in the center 21 is larger than the light intensity in the periphery 22. Moreover, the light intensity is smaller from the center 21 toward the periphery 22.

The illumination light 20 passes through the predetermined illumination region. In addition, the illumination light 20 is transmitted through the sample. Light transmitted through the sample is incident on the observation optical system. A state in the predetermined illumination region and a state at the pupil position of the observation optical system will be described below.

Figure 10A:
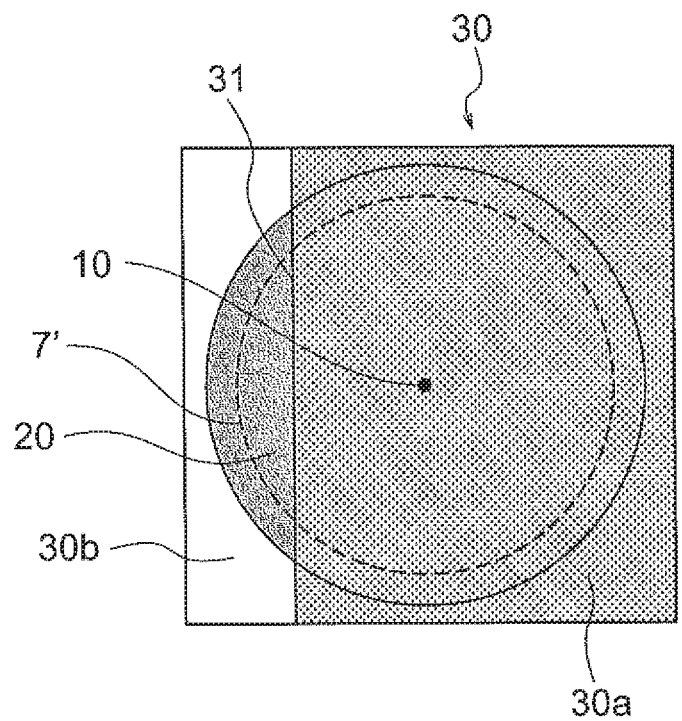
FIG. 10A is a diagram illustrating a state of illumination light.
Figure 10B:
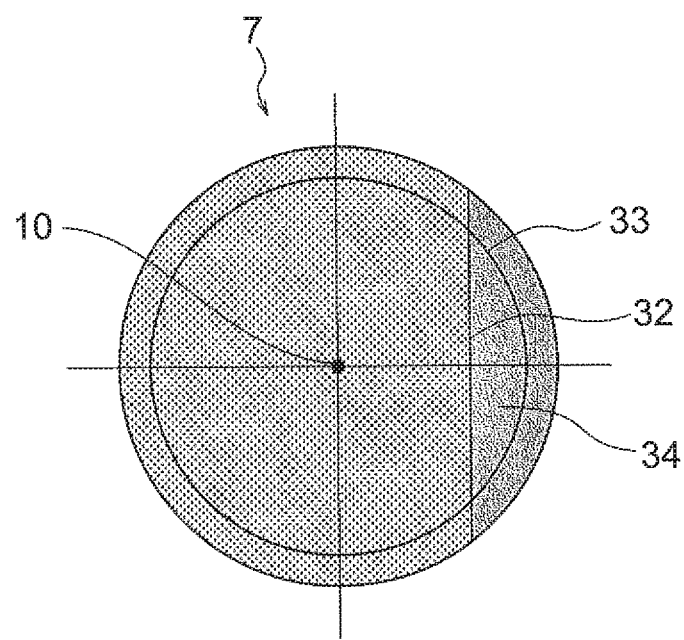
FIG. 10B is a diagram illustrating a state of imaging light.

FIG. 10A is a diagram illustrating a state of illumination light. FIG. 10B is a diagram illustrating a state of imaging light. FIG. 10A illustrates a state of illumination light 20 applied to the aperture member 30. It is possible that the illuminated region of the illumination light 20 is regarded as the pupil of the illumination optical system. Accordingly, a state in which the pupil of the illumination optical system is superimposed on the aperture member 30 is illustrated in FIG. 10A.

The aperture member 30 includes a light-shielding part 30a and an opening 30b. When the aperture member 30 is inserted into the optical path of the illumination optical system, the aperture member 30 is disposed such that the light-shielding part 30a includes the optical axis 10. The opening 30b is located in a place eccentric to the optical axis 10. The optical axis 10 is an optical axis of the whole optical system in a sample shape measuring apparatus 200 (described later). Accordingly, the optical axis 10 can be read as "optical axis of the condenser lens", if necessary.

A boundary line 31 is formed between the light-shielding part 30a and the opening 30b. The light-shielding part 30a and the opening 30b are divided by the boundary line 31. The boundary line 31 is a line parallel with a straight line orthogonal to the optical axis 10.

FIG. 10B illustrates a state of imaging light at the position of the pupil 7 of the objective lens. The boundary line 32 is a first boundary line. The boundary line 32 is an image of the boundary line 31. A boundary line 33 is an external boundary line. The boundary line 33 is formed of part of an outer edge of the pupil 7 of the objective lens. A light flux transmission region 34 is surrounded by the boundary line 32 and the boundary line 33. The light flux transmission region is a region of light passing through the pupil 7 of the objective lens.

When the boundary line located on the optical axis side is formed of a line parallel with a straight line orthogonal to the optical axis, the boundary line is "boundary line of type 1". The boundary line 31 and the boundary line 32 serve as boundary lines of type 1.

The characteristic (hereinafter referred to as "correlation characteristic") representing correlation between the amount of tilt in the surface of the sample and the quantity of light of the imaging light differs between illumination light (hereinafter referred to as "illumination light $L_{uni}$") with a light intensity distributed uniformly and illumination light (hereinafter referred to as "illumination light $L_{non\text{-}uni}$") with a light intensity distributed non-uniformly. As the illumination light $L_{non\text{-}uni}$, for example, the illumination light 20 exists.

Figure 11A:
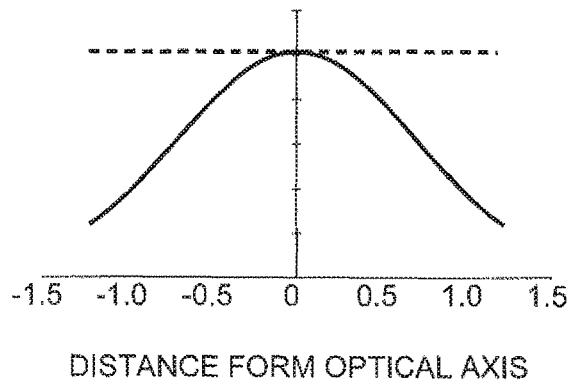
FIG. 11A is a graph illustrating a light intensity distribution of illumination light.

FIG. 11A is a graph illustrating a light intensity distribution of illumination light. The solid line represents a light intensity distribution of the illumination light 20, and the broken line represents a light intensity distribution of the illumination light $L_{uni}$. As illustrated in FIG. 11A, in the illumination light 20, the light intensity in the center of light flux is larger than the light intensity in the periphery. Moreover, the light intensity decreases from the center toward the periphery of the flux.

Figure 11B:
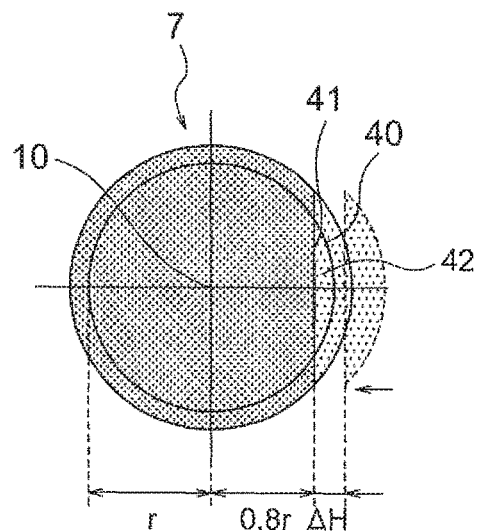
FIG. 11B is a diagram illustrating a state of imaging light in a boundary line of type 1.

FIG. 11B is a diagram illustrating a state of imaging light in the boundary line of type 1. A boundary line 41 is a first boundary line. A boundary line 40 is an external boundary line. The boundary line 40 is formed of part of the outer edge of the pupil 7 of the objective lens. The light flux transmission region 42 is surrounded by the boundary line 40 and the boundary line 41.

The shift amount means the movement quantity of the light flux transmission region. In FIG. 11B, the shift amount of the light flux transmission region 42 is represented by ΔH. The direction in which the light flux transmission region 42 approaches the optical axis 10 is positive. Here, the light flux transmission region is moved in left and right directions (hereinafter referred to as "X direction") in the sheet.

The light flux transmission region is shifted in accordance with the amount of tilt in the surface of the sample. In addition, the area of the light flux transmission region changes in accordance with shift of the light flux transmission region. The quantity of light of imaging light is the sum total of light intensities in the light flux transmission region (hereinafter referred to as "sum total of light intensities"). Accordingly, it is possible that the correlation characteristic described above is represented by change in sum total of light intensities at a time when the shift amount of the light flux transmission region is changed. It is possible that the sum total of the light intensities is obtained by integrating light intensities at respective points in the light flux transmission region.

Figure 11C:
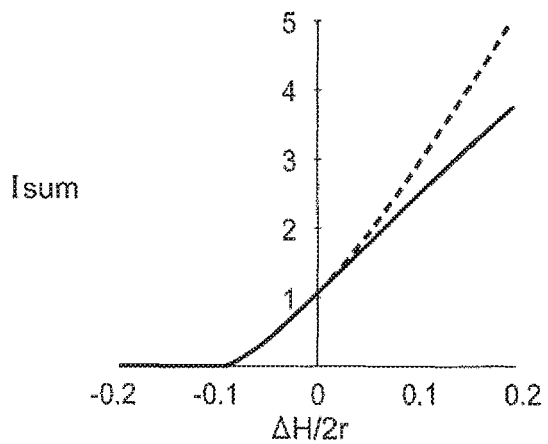
FIG. 11C is a diagram illustrating correlation characteristics in the boundary line of type 1.

FIG. 11C is a diagram illustrating correlation characteristics in the boundary line of type 1. $I_{sum}$ represents the sum total of light intensities. FIG. 11C illustrates a correlation characteristic in illumination light $L_{uni}$ and a correlation characteristic in the illumination light 20. The graph of FIG. 11C is a graph illustrating results of simulations.

In the simulation in the boundary line of type 1, as illustrated in FIG. 11B, the radius of the pupil 7 of the objective lens is r, and the distance from the optical axis 10 to the boundary line 41 is 0.8×r. The distance from the optical axis 10 to the boundary line 41 is a distance in a direction in which the light flux transmission region is shifted.

In the graph of FIG. 11C, a simulation result in the illumination light 20 is represented by a solid line, and a simulation result in the illumination light $L_{uni}$ is represented by a broken line. In both the simulations, the value of the vertical axis is standardized with a value at a time when ΔH/2r=0.

As illustrated in FIG. 11C, the tilt in the solid line is smaller than the tilt in the broken line. This means that the detection sensitivity in the illumination light 20 is lower than the detection sensitivity in the illumination light $L_{uni}$. This point will be described below.

Figure 12:
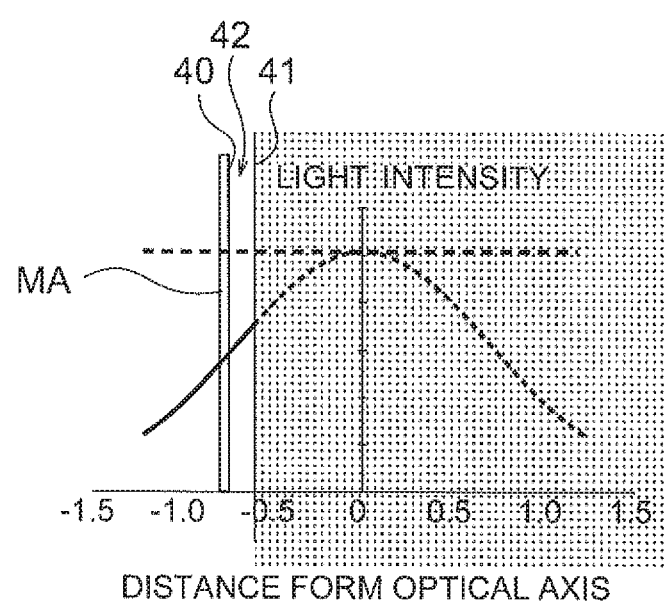
FIG. 12 is a graph illustrating a light intensity distribution of imaging light.

In FIG. 1, for example, when the imaging light $L_{SP1}$ is shifted in a left direction in the sheet, part of the region in the imaging light $L_{SP2}$ enters inside the pupil 7 of the objective lens. FIG. 12 illustrates a light intensity of the region (hereinafter referred to as "movement region MA") entering inside the pupil 7 of the objective lens.

FIG. 12 is a graph illustrating a light intensity distribution of imaging light. The solid line represents a light intensity distribution of imaging light when illumination is performed with the illumination light 20, and the broken line represents a light intensity distribution of imaging light when illumination is performed with the illumination light $L_{uni}$.

In the illumination light $L_{uni}$, the light intensity in the movement region MA is equal to the light intensity of the light flux transmission region 42 (region located on the right side of the movement region MA). By contrast, in the illumination light 20, the light intensity in the movement region MA is smaller than the light intensity of the light flux transmission region 42.

In the illumination light $L_{uni}$, the movement region MA having the same light intensity as that of the light flux transmission region 42 is added to the light flux transmission region 42. By contrast, in the illumination light 20, the movement region MA having a light intensity smaller than that of the light flux transmission region 42 is added to the light flux transmission region 42.

In this case, the change rate of the light intensity in the illumination light 20 is smaller than the change rate of the light intensity in the illumination light $L_{uni}$. For this reason, the detection sensitivity in the illumination light 20 is lower than the detection sensitivity in the illumination light $L_{uni}$.

However, when the detection sensitivity is low, the detection range is broadened. Accordingly, the detection range in the illumination light 20 is broader than the detection range in the illumination light $L_{uni}$. As a result, in the illumination light 20, it is possible to detect a larger amount of tilt than that in the illumination light $L_{uni}$.

As described above, in the case of using the illumination light 20, change in quantity of light of imaging light with respect to change in amount of tilt is smaller than that in the case of using the illumination light $L_{uni}$ (illumination light having a uniform light intensity distribution). Therefore, when the illumination light 20 is used, the range in which the amount of tilt can be measured is broadened. Accordingly, with the sample shape measuring method of the present embodiment, it is possible to measure the surface of a sample having a larger amount of tilt.

In the illumination light 20, the light intensity decreases from the center toward the periphery of the light flux. When the percentage by which the light intensity decreases (hereinafter referred to as "decrease percentage") is changed, the detection range and the detection sensitivity change. Then, a plurality of illumination lights are prepared in advance, and the illumination lights are set to have different decrease percentages. As another example, the decrease percentage is set to change in one illumination light. By doing this, it is possible to change the detection range and the detection sensitivity. As a result, it is possible to measure the amount of tilt in the surface of the sample, even when the amount of tilt is large in the surface or the amount of tilt is small in the surface.

The illumination light 20 and the illumination light $L_{uni}$ may be prepared in advance. As another example, one illumination light may be changed from the illumination light 20 to the illumination light $L_{uni}$, or changed conversely. By doing this, it is possible to change the detection range and the detection sensitivity. As a result, it is possible to measure the amount of tilt in the surface of the sample, even when the amount of tilt is large in the surface or the amount of tilt is small in the surface.

In the sample shape measuring method of the present embodiment, it is preferable that the light intensity of illumination light incident on the predetermined illumination region be larger from the center toward the periphery of the light flux.

Figure 13:
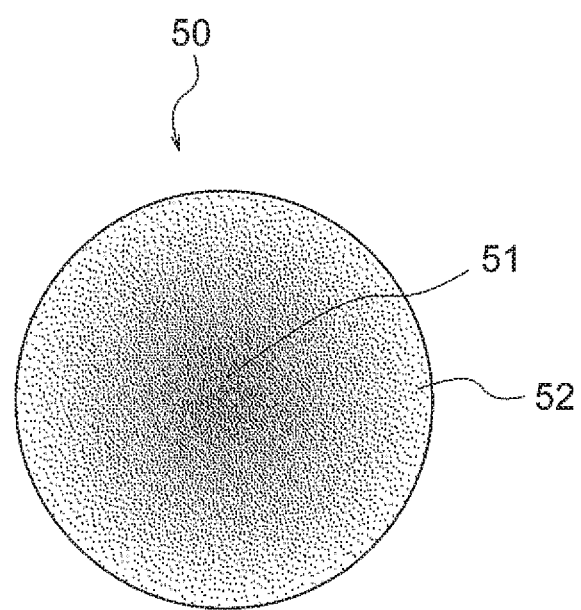
FIG. 13 is a diagram illustrating a light intensity distribution of illumination light.

FIG. 13 is a diagram illustrating a light intensity distribution of illumination light. Illumination light 50 is illumination light having a non-uniformly distributing light intensity. Directly before incidence on the aperture member, the shape of the illumination light 50 is circular.

In the illumination light 50, the light intensity differs between a center 51 of the light flux and a periphery 52 of the light flux. The light intensity in the center 51 is smaller than the light intensity in the periphery 52. In addition, the light intensity increases from the center 51 toward the periphery 52.

As described above, the correlation characteristic differs between the illumination light $L_{uni}$ and the illumination light $L_{non-uni}$. As the illumination light $L_{non-uni}$, for example, the illumination light 50 exists.

Figure 14A:
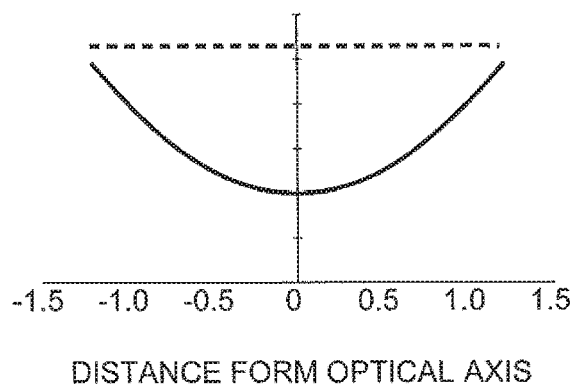
FIG. 14A is a graph illustrating a light intensity distribution of illumination light.

FIG. 14A is a graph illustrating a light intensity distribution of illumination light. The solid line represents a light intensity distribution of the illumination light 50, and the broken line represents a light intensity distribution of the illumination light $L_{uni}$. As illustrated in FIG. 14A, in the illumination light 50, the light intensity in the center of the light flux is smaller than the light intensity in the periphery.

In addition, the light intensity increases from the center toward the periphery of the light flux.

Figure 14B:
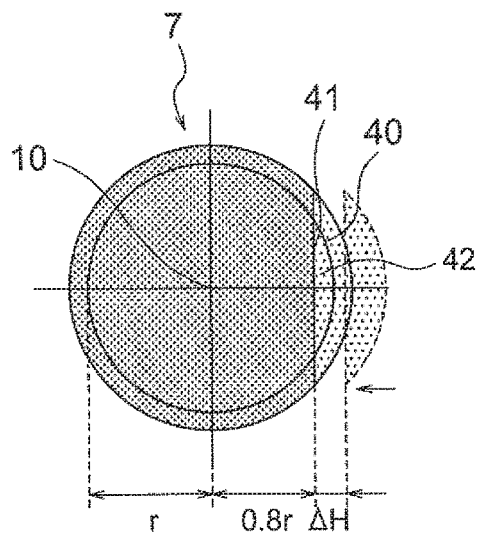
FIG. 14B is a diagram illustrating a state of imaging light in a boundary line of type 1.

The diagram illustrated in FIG. 14B is the same as the diagram illustrated in FIG. 11B. Therefore, an explanation of the FIG. 14B is omitted.

Figure 14C:
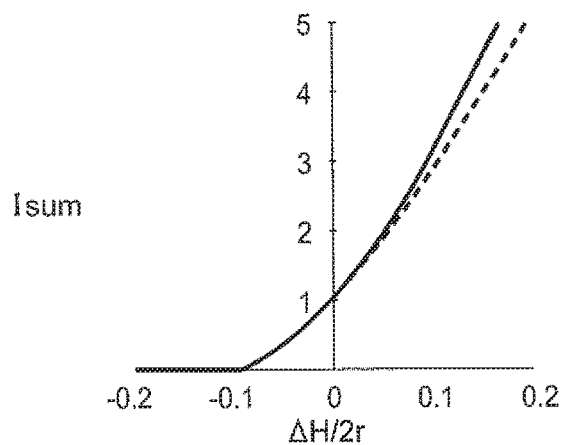
FIG. 14C is a diagram illustrating correlation characteristics in the boundary line of type 1.

FIG. 14C is a diagram illustrating correlation characteristics in the boundary line of type 1. FIG. 14C illustrates a correlation characteristic in the illumination light $L_{uni}$ and a correlation characteristic in the illumination light 50. The graph of FIG. 14C is a graph illustrating results of simulations.

In the graph of FIG. 14C, a simulation result in the illumination light 50 is represented by a solid line, and a simulation result in the illumination light $L_{uni}$ is represented by a broken line. In both the simulations, the value of the vertical axis is standardized by the value at a time of $\Delta H/2r=0$.

As illustrated in FIG. 14C, the tilt in the solid line is larger than the tilt in the broken line. This means that the detection sensitivity in the illumination light 50 is higher than the detection sensitivity in the illumination light $L_{uni}$. This point will be described below.

The light intensity distribution of imaging light when the illumination light 50 is used is obtained by vertically reversing the light intensity distribution of imaging light at a time when the illumination light 20 is used. In this case, as described above, in the illumination light $L_{uni}$, the light intensity in the movement region MA is equal to the light intensity of the light flux transmission region 42 (region located on the right side of the movement region MA). By contrast, in the illumination light 50, the light intensity in the movement region MA is larger than the light intensity of the light flux transmission region 42.

In the illumination light $L_{uni}$, the movement region MA having the same light intensity as that of the light flux transmission region 42 is added to the light flux transmission region 42. By contrast, in the illumination light 50, the movement region MA having a light intensity larger than that of the light flux transmission region 42 is added to the light flux transmission region 42.

In this case, the change rate of the light intensity in the illumination light 50 is larger than the change rate of the light intensity in the illumination light $L_{uni}$. For this reason, the detection sensitivity in the illumination light 50 is higher than the detection sensitivity in the illumination light $L_{uni}$.

However, when the detection sensitivity is high, the detection range is narrowed. Accordingly, the detection range in the illumination light 50 is narrower than the detection range in the illumination light $L_{uni}$.

As described above, in the case of using the illumination light 50, change in quantity of light of imaging light with respect to change in amount of tilt is larger than that in the case of using the illumination light $L_{uni}$ (illumination light having a uniform light intensity distribution). Therefore, the detection sensitivity increases by using the illumination light 50. Accordingly, with the sample shape measuring method of the present embodiment, it is possible to measure the surface of a sample having a smaller amount of tilt.

In the illumination light 50, the light intensity increases from the center toward the periphery of the light flux. When the percentage by which the light intensity increases (hereinafter referred to as "increase percentage") is changed, the detection range and the detection sensitivity change. Then, a plurality of illumination lights are prepared in advance, and the illumination lights are set to have different increase percentages. As another example, the increase percentage is set to change in one illumination light. By doing this, it is possible to change the detection range and the detection sensitivity. As a result, it is possible to measure the amount of tilt in the surface of the sample, even when the amount of tilt is large in the surface or the amount of tilt is small in the surface.

The illumination light 50 and the illumination light $L_{uni}$ may be prepared in advance. As another example, one illumination light may be changed from the illumination light 50 to the illumination light $L_{uni}$, or changed conversely. By doing this, it is possible to change the detection range and the detection sensitivity. As a result, it is possible to measure the amount of tilt in the surface of the sample, even when the amount of tilt is large in the surface or the amount of tilt is small in the surface.

As described above, in the sample shape measuring method of the present embodiment, the light flux transmission region moves in accordance with the amount of tilt in the surface of the sample. When the tilt in the surface of the sample occurs in the X direction, the light flux transmission region 42 moves in the X direction, as illustrated in FIG. 11B. However, there are cases where the tilt in the surface of the sample occurs also in the vertical direction (hereinafter referred to as "Y direction") in the sheet, as well as the X direction.

Also in the case where the amount of tilt in the X direction is made, as illustrated in FIG. 10A, the opening 30b is made to be positioned in the X direction. In this manner, it is possible to measure the tilt in the surface of the sample occurring in the X direction. Thereafter, the opening 30b is rotated by 90°, with the optical axis 10 serving as the rotation axis. By the rotation, the opening 30b is positioned in the Y direction, and measurement is performed in this state. By doing this, it is possible to measure tilt in the surface of the sample occurring in the Y direction.

Even when the tilt in the X direction and the tile in the Y direction are mixed, it is preferable that only the amount of tilt in the X direction can be measured in measurement in the X direction. However, due to the tilt in the Y direction, the light flux transmission region moves also in the Y direction, as illustrated in FIG. 15A.

Figure 15A:
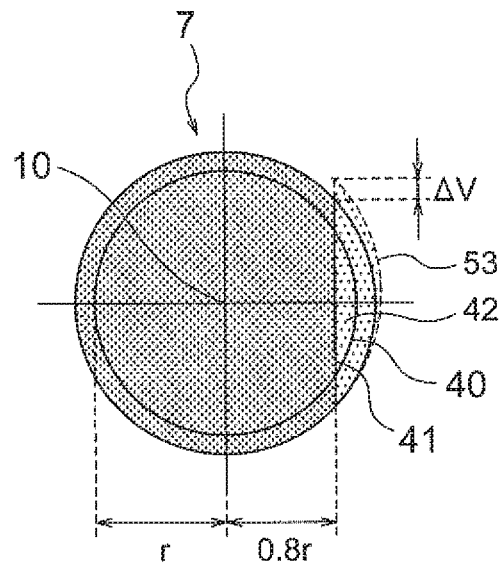
FIG. 15A is a diagram illustrating a state of imaging light in a boundary line of type 1.

FIG. 15A is a diagram illustrating a state of imaging light in the boundary line of type 1. The light flux transmission region 42 moves together with the light flux positioned outside the pupil 7 of the objective lens. In FIG. 15A, the shift amount $\Delta V$ is illustrated using an outer edge 53 of the light flux, for easy viewing.

Figure 15B:
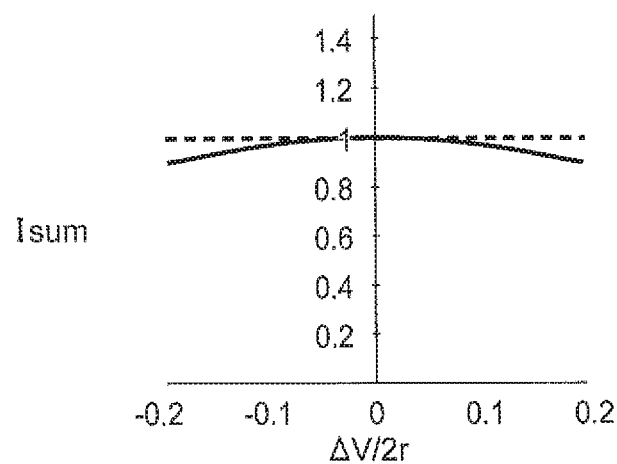
FIG. 15B is a diagram illustrating correlation characteristics in the boundary line of type 1.

FIG. 15B is a diagram illustrating correlation characteristics in the boundary line of type 1. FIG. 15B illustrates a correlation characteristic in the illumination light $L_{uni}$ and a correlation characteristic in the illumination light 20. The graph of FIG. 15B is a graph illustrating results of simulations.

In the graph illustrated in FIG. 15B, a simulation result in the illumination light 20 is represented by a solid line, and a simulation result in the illumination light $L_{uni}$ is represented by a broken line. In both the simulations, the value of the vertical axis is standardized with a value at a time of $\Delta V/2r=0$.

As illustrated in FIG. 15B, in the illumination light $L_{uni}$, even when the shift amount $\Delta V$ is changed, the size of the light flux transmission region is not changed. This means that, in the case of using the boundary line of type 1, no tilt in the Y direction is measured, but it is possible to measure only the tilt in the X direction, in measurement in the X direction using the illumination light $L_{uni}$, even when any tilt in the Y direction exists in the measurement place.

By contrast, in the illumination light 20, as the shift amount ΔV increases, the size of the light flux transmission region decreases. This means that, in the case of using the boundary line of type 1, when any tilt in the Y direction exists in the measurement place, measurement in the X direction using the illumination light $L_{uni}$ is influenced by the tilt in the Y direction. In this case, an error is added to the original tilt in the X direction.

In the sample shape measuring method according to the present embodiment, it is preferable that the light transmitted through the observation optical system be light passing through the light flux transmission region, the light flux transmission region be a region surrounded by an external boundary line and a second boundary line, the external boundary line be formed of part of an outer edge of the pupil of the observation optical system, both the external boundary line and the second boundary line have a projecting shape, and the direction of the projection is the same between the external boundary line and the second boundary line.

In the case of performing measurement using the sample shape measuring method of the present embodiment, it is preferable that the sample shape measuring apparatus of the present embodiment include a first aperture member as the aperture member, the first aperture member have a boundary line dividing the light-shielding part and the opening, and a straight line connecting predetermined two points be located between the boundary line and the optical axis. Here, the predetermined two points are two points at which a predetermined line crosses the outer edge of the pupil of the illumination optical system when the pupil of the illumination optical system is superimposed on the first aperture member.

Figure 16A:
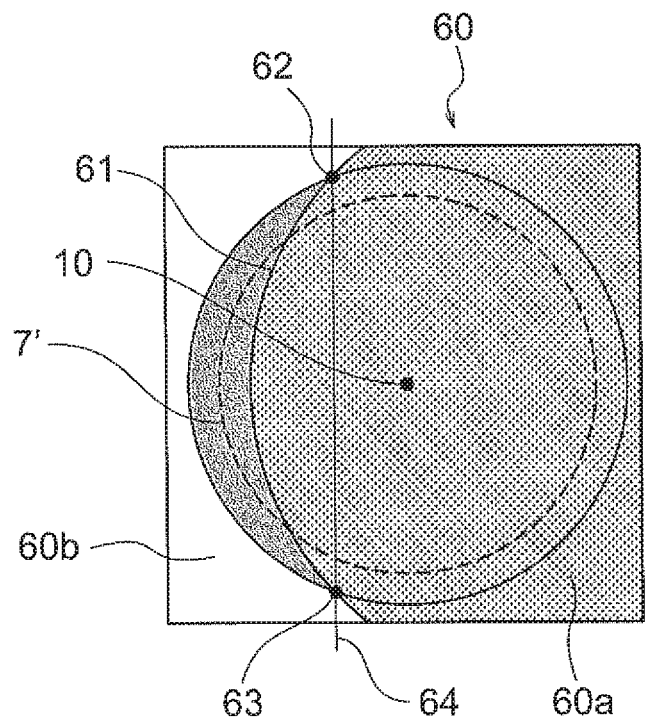
FIG. 16A is a diagram illustrating a state of illumination light when a first aperture member is used.
Figure 16B:
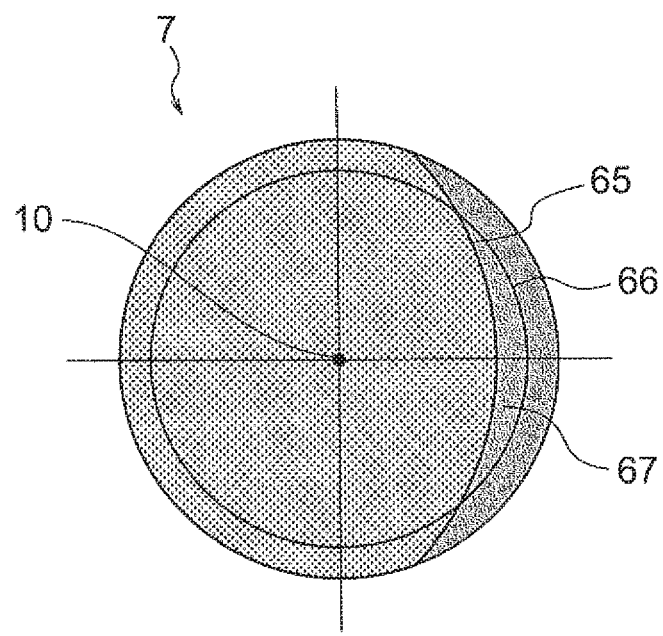
FIG. 16B is a diagram illustrating a state of imaging light when the first aperture member is used.

FIG. 16A is a diagram illustrating a state of illumination light when the first aperture member is used. FIG. 16B is a diagram illustrating a state of imaging light when the first aperture member is used. FIG. 16A illustrates a state of illumination light applied to a first aperture member 60. It is possible that the illuminated region of the illumination light is regarded as the pupil of the illumination optical system. Accordingly, FIG. 16A illustrates a state in which the pupil of the illumination optical system is superimposed on the first aperture member 60.

The first aperture member 60 includes a light-shielding part 60a and an opening 60b. When the first aperture member 60 is inserted into the optical path of the illumination optical system, the first aperture member 60 is disposed such that the light-shielding part 60a includes the optical axis 10. The opening 60b is located in a place eccentric to the optical axis 10.

A boundary line 61 is formed between the light-shielding part 60a and the opening 60b. The shielding part 60a and the opening 60b are divided by the boundary line 61.

When the pupil of the illumination optical system is superimposed on the first aperture member 60, the boundary line 61 and the outer edge of the pupil of the illumination optical system cross at a point 62 and a point 63. The point 62 and the point 63 are the predetermined two points. A straight line 64 is a straight line running through the point 62 and the point 63.

The boundary line 61 is formed of an arc. The arc is formed to project from the light-shielding part 60a toward the opening 60b. Accordingly, in the first aperture member 60, the straight line 64 is positioned between the boundary line 61 and the optical axis 10.

In the first aperture member 60, the boundary line 61 is a line formed of a curve. However, the boundary line 61 may be any of a line formed of a plurality of straight lines, a line formed of a plurality of curves, and a line formed of a curve and a straight line.

FIG. 16B illustrates a state of imaging light at the position of the pupil 7 of the objective lens. A boundary line 65 is a second boundary line. The boundary line 65 is an image of the boundary line 61. A boundary line 66 is an external boundary line. The boundary line 66 is formed of part of the outer edge of the pupil 7 of the objective lens. The light flux transmission region 67 is surrounded by the boundary line 65 and the boundary line 66.

Both the boundary line 65 and the boundary line 66 have a projecting shape. The direction of the projection is the same between the boundary line 65 and the boundary line 66. In this case, the shape of the light flux transmission region 67 is a meniscus shape with a concave portion facing the optical axis 10 side. Accordingly, it can be said that the boundary line 65 is formed of a concave line facing the optical axis 10 side.

In the case where the boundary line located on the optical axis side is formed of a concave line facing the optical axis side, the boundary line is defined as "boundary line of type 2". The boundary line 61 and the boundary line 65 serve as boundary lines of type 2.

As described above, although the correlation characteristic differs according to a distribution pattern of the light intensity in the illumination light, the correlation characteristic also differs according to the shape of the boundary lines.

Figure 17A:
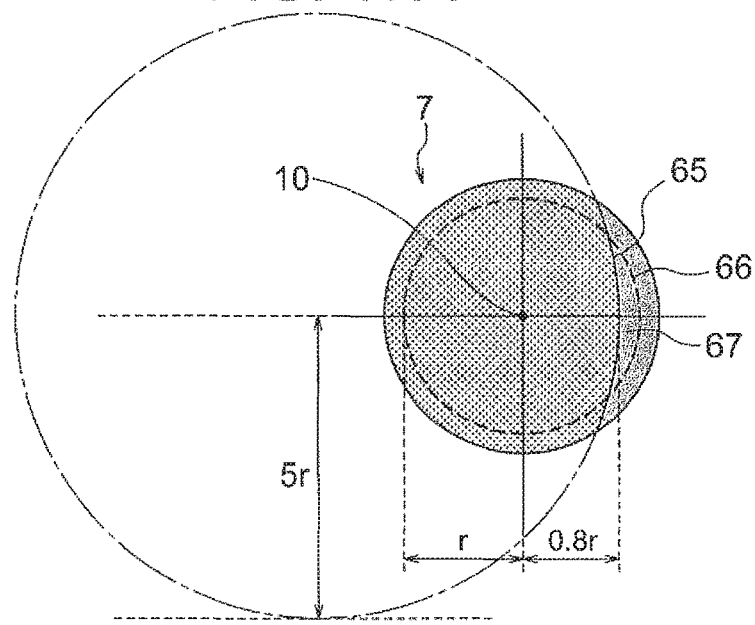
FIG. 17A is a diagram illustrating a state of imaging light in a boundary line of type 2.

FIG. 17A is a diagram illustrating a state of imaging light in the boundary line of type 2. In the simulation in the boundary line of type 2, as illustrated in FIG. 17A, the radius of the pupil 7 of the objective lens is r, and the distance from the optical axis 10 to the boundary line 65 is 0.8×r. The boundary line 65 is formed of an arc of a circle having a radius of 5×r. The distance from the optical axis 10 to the boundary line 65 is a distance in a direction in which the light flux transmission region 67 is shifted.

Figure 17B:
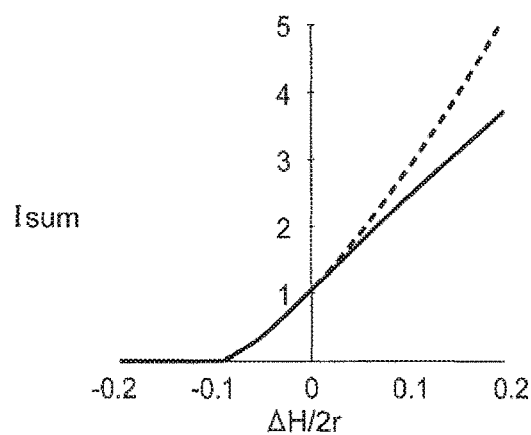
FIG. 17B is a diagram illustrating correlation characteristics in an X direction in the boundary line of type 2.
Figure 17C:
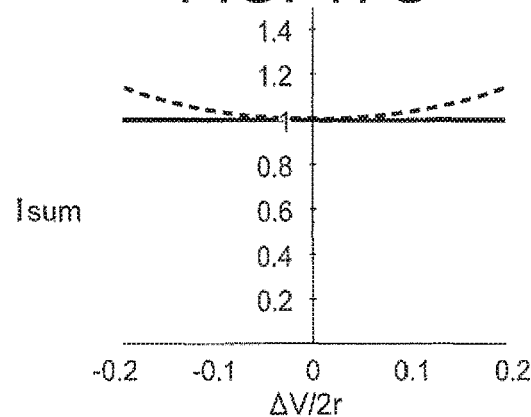
FIG. 17C a diagram illustrating correlation characteristics in a Y direction in the boundary line of type 2.

FIG. 17B and FIG. 17C are diagrams illustrating correlation characteristics in the boundary line of type 2. The correlation characteristics in the X direction are as illustrated in the graph illustrated FIG. 17B. The correlation characteristics in the Y direction are as illustrated in the graph illustrated FIG. 17C. The graphs of FIG. 17B and FIG. 17C are graphs illustrating results of simulations.

FIG. 17B and FIG. 17C illustrate a correlation characteristic in the illumination light $L_{uni}$ and a correlation characteristic in the illumination light 20. The simulation result in the illumination light 20 is represented by a solid line, and the simulation result in the illumination light $L_{uni}$ is represented by a broken line. In the correlation characteristics in the X direction, the value of the vertical axis is standardized with a value at a time of ΔH/2r=0. In the correlation characteristics in the Y direction, the value of the vertical axis is standardized with a value at a time of ΔV/2r=0.

The correlation characteristics in the X direction will be compared below using FIG. 11C and FIG. 17B. As illustrated in FIG. 11C and FIG. 17B, in both the drawings, the tilt in the solid line is smaller than the tilt in the broken line. This means that the detection sensitivity in the illumination light 20 is lower than the detection sensitivity in the illumination light $L_{uni}$, both in the boundary line of type 1 and the boundary line of type 2.

Next, the correlation characteristics in the Y direction will be compared below using FIG. 15B and FIG. 17C. In the illumination light $L_{non-uni}$, the distribution of the light intensity in the light flux transmission region changes according to shift of the light flux transmission region. When the distribution of the light intensity in the light flux transmission region changes, the sum total of the light intensities changes. Therefore, when the sum total of the light intensity fluctuates, the quantity of light of the imaging light fluctuates. Accordingly, in the following description, "fluctuations in quantity of light" is used instead of "fluctuations in sum total of light intensities".

As illustrated in FIG. 15B and FIG. 17C, the solid line is a straight line in FIG. 17C, while the solid line is a curve in FIG. 15B. This means that, in the case of using the illumination light 20, fluctuations in quantity of light occurs in the Y direction when the boundary line of type 1 is used, while it is possible to prevent occurrence of fluctuations in quantity of light in the Y direction when the boundary line of type 2 is used.

Moreover, as illustrated in FIG. 15B and FIG. 17C, the broken line is a curve in FIG. 17C, while the broken line is a straight line in FIG. 15B. This means that, in the case of using the illumination light $L_{uni}$, fluctuations in quantity of light occurs in the Y direction when the boundary line of type 2 is used, while it is possible to prevent occurrence of fluctuations in quantity of light in the Y direction when the boundary line of type 1 is used.

Occurrence of fluctuations in quantity of light in the Y direction means that the measurement result of the amount of tilt in the X direction depends on the tilt in the Y direction. Moreover, absence of occurrence in fluctuations in quantity of light in the Y direction means that the measurement result of the amount of tilt in the X direction does not depend on the tilt in the Y direction. The same is applicable to the case of measuring the amount of tilt in the Y direction.

When the comparison results described above are put together, the results are as illustrated in Table 1 below. The first direction is one direction of two orthogonal directions, and a direction in which the opening (light flux transmission region) of the aperture member is located. The second direction is a direction orthogonal to the first direction.

TABLE 1

| | | | Boundary line | |
| --- | --- | --- | --- | --- |
| | | | Type 1 | Type 2 |
| Light intensity distribution | Illumination light $L_{uni}$ (uniform) | Detection sensitivity (first direction) | high | low |
| | | Measurement range (first direction) | narrow | broad |
| | | Fluctuations in quantity of light (second direction) | not exist | exist |
| | Illumination light 20 (center > periphery) | Detection sensitivity (first direction) | high | low |
| | | Measurement range (first direction) | narrow | broad |
| | | Fluctuations in quantity of light (second direction) | exist | not exist |

When fluctuations in quantity of light occur in the second direction at a time of performing measurement of the amount of tilt in the first direction, a measurement error occurs. In the sample shape measuring method of the present embodiment, in the case of using the illumination light 20, the boundary line of type 2 is used. For this reason, even though the measurement range for the amount of tilt is broad, no fluctuations in quantity of light occur in the second direction, when measurement of amount of tilt is performed in the first direction. Accordingly, it is possible to perform measurement of amount of tilt with little error.

Moreover, it is found from Table 1 that it is effective to use a combination of the illumination light $L_{uni}$ and the boundary line of type 1, or use a combination of the illumination light 20 and the boundary line of type 2, in order to prevent occurrence of a measurement error. These two combinations are different in detection sensitivity (measurement range). Therefore, one of the combinations may be used in accordance with the sample and/or the purpose of measurement.

In the case of using the boundary line of type 2, it is preferable that the boundary line be an arc, and satisfy Conditional Equation (8) below.

$$\alpha < \beta \cdot d < 19.5\alpha - 5 \quad (8)$$

where $$\alpha = L_\alpha/r, \ \beta = L_\beta/r (\beta > 1),$$

$L_\alpha$ is a minimum distance of distances from the center of the pupil of the objective lens to the second boundary line,
$L_\beta$ is a radius of the second boundary line,
r is a radius of the pupil of the objective lens, and
d is a difference between the light intensity in the center of the pupil of the objective lens and the light intensity at the outer edge of the pupil of the objective lens.

As another example, it is more preferable that the boundary line satisfy Conditional Equation (8') below.

$$\alpha + 0.2 < \beta \cdot d < 19.5\alpha - 11.1 \quad (8')$$

Figure 18A:
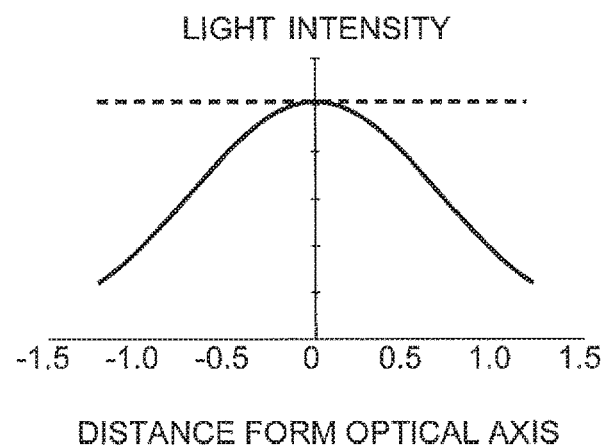
FIG. 18A is a diagram illustrating a light intensity at a pupil position of an objective lens.
Figure 18B:
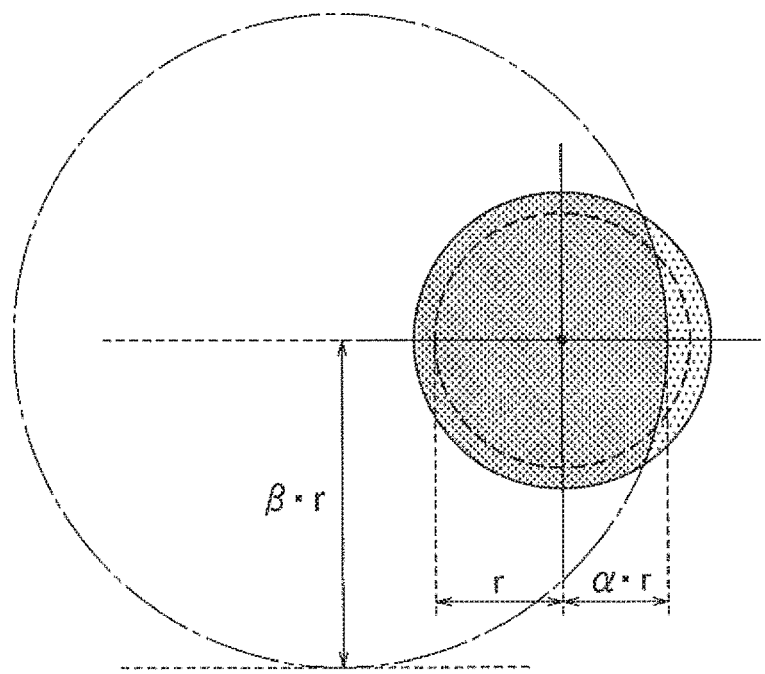
FIG. 18B is a diagram illustrating a state of a second boundary line at a pupil position of the objective lens.

FIG. 18A and FIG. 18B are diagrams for explaining parameters of Conditional Equation (8). Conditional Equations (8) and (8') are premised on (IA), (IB), and (IC) below.

(IA) The amount of tilt in the surface of the sample is zero.

(IB) No loss of quantity of light occurs from the opening of the aperture member to the pupil of the objective lens.

(IC) The whole pupil of the objective lens is filled with illumination light.

FIG. 18A is a diagram illustrating the light intensity at the pupil position of the objective lens. When the aperture member is disposed in the optical path, imaging light does not reach the center of the pupil of the objective lens. In this case, it is impossible to set the value of d. For this reason, as stated in (IC), the value of d is set on the supposition that the whole pupil of the objective lens is filled with illumination light.

FIG. 18B is a diagram illustrating a state of the second boundary line at the pupil position of the objective lens. As illustrated in FIG. 18B, the position of the second boundary line is determined according to the value of α, and the radius of the arc of the second boundary line is determined according to the value of β.

As described above, even in the case where the tilt in the X direction and the tilt in the Y direction are mixed, it is preferable that it is possible to measure only the amount of tilt in the X direction in measurement in the X direction. However, due to tilt in the Y direction, the light flux transmission region also moves in the Y direction, as illustrated in FIG. 19A.

Figure 19A:
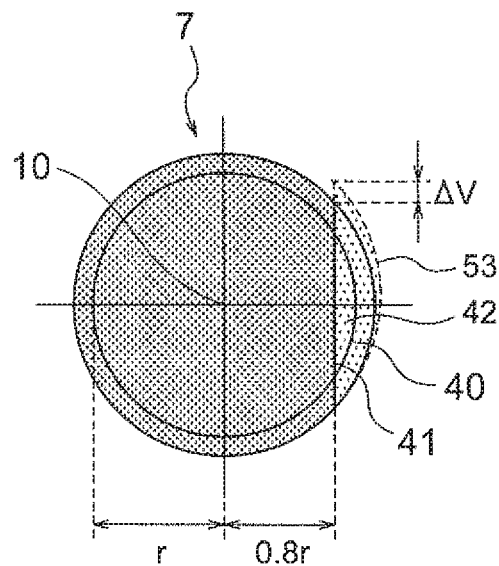
FIG. 19A is a diagram illustrating a state of imaging line in the boundary line of type 1.

FIG. 19A is a diagram illustrating a state of imaging light in the boundary line of type 1. Because FIG. 19A is the same as FIG. 15A, an explanation of FIG. 19A will be omitted.

Figure 19B:
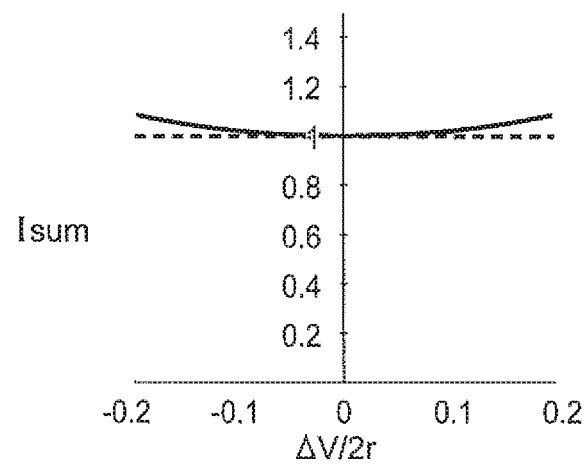
FIG. 19B is a diagram illustrating correlation characteristics in the boundary line of type 1.

FIG. 19B is a diagram illustrating correlation characteristics in the boundary line of type 1. FIG. 19B illustrates a correlation characteristic in the illumination light $L_{uni}$ and the correlation characteristic in the illumination light 50. The graph of FIG. 19B is a graph illustrating results of simulations.

In the graph of FIG. 19B, a simulation result in the illumination light 50 is represented by a solid line, and a simulation result in the illumination light $L_{uni}$ is represented by a broken line. In both the simulations, the value of the vertical axis is standardized with the value at a time of ΔV/2r=0.

As illustrated in FIG. 19B, in the illumination light $L_{uni}$, even when the shift amount ΔV is changed, the size of the light flux transmission region is not changed. Because this point has already been described with FIG. 15B, and an explanation thereof here will be omitted.

By contrast, in the illumination light 50, as the shift amount ΔV increases, the size of the light flux transmission region increases. This means that, in the case of using the boundary line of type 1, when any tilt in the Y direction exists in the measurement place, measurement in the X direction using the illumination light $L_{uni}$ is influenced by the tilt in the Y direction. In this case, an error is added to the original tilt in the X direction.

Therefore, in the sample shape measuring method of the present embodiment, it is preferable that light transmitted through the observation optical system be light passing through the light flux transmission region, the light flux transmission region be a region surrounded by an external boundary line and a third boundary line, the external boundary line be formed of part of an outer edge of the pupil of the observation optical system, both the external boundary line and the third boundary line have a projecting shape, and the direction of the projection is directly opposite between the external boundary line and the third boundary line.

In the case of performing measurement using the sample shape measuring method of the present embodiment, it is preferable that the sample shape measuring apparatus of the present embodiment include a second aperture member as the aperture member, the second aperture member have a boundary line dividing the light-shielding part and the opening, and a the boundary line be located between a straight line connecting predetermined two points and the optical axis. Here, the predetermined two points are two points at which a predetermined line crosses the outer edge of the pupil of the illumination optical system when the pupil of the illumination optical system is superimposed on the second aperture member.

Figure 20A:
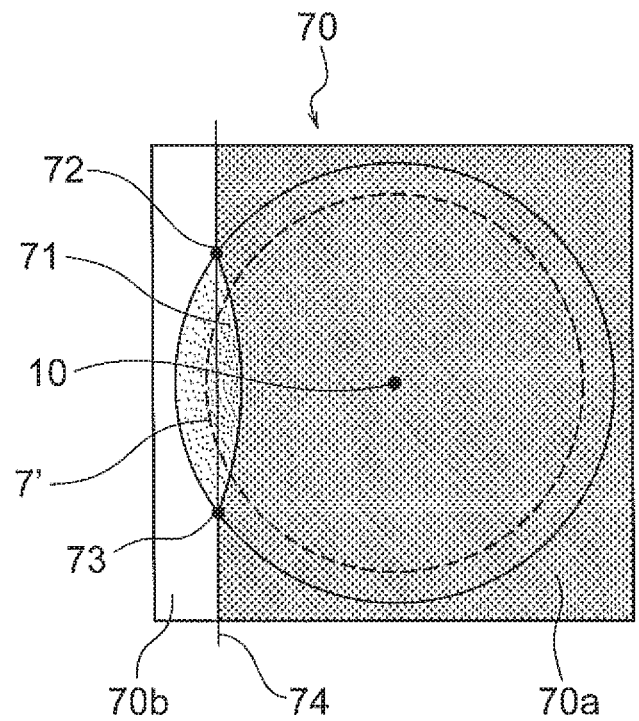
FIG. 20A is a diagram illustrating a state of illumination light when a second aperture member is used.
Figure 20B:
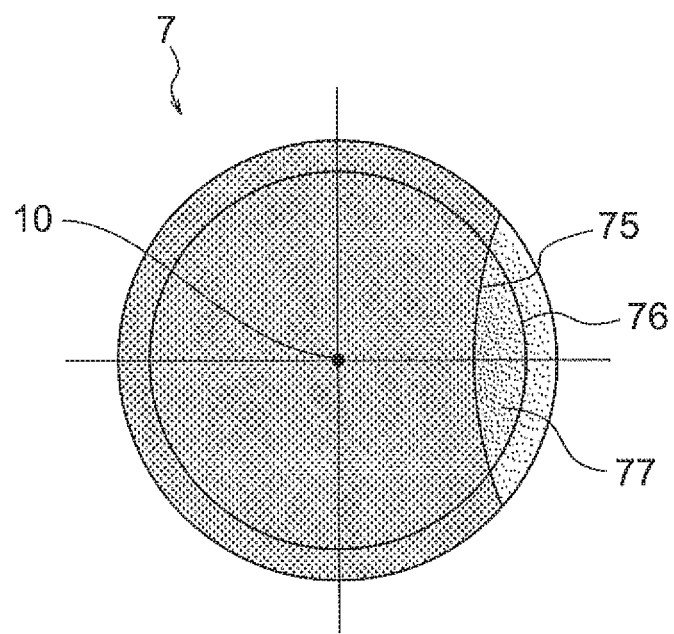
FIG. 20B is a diagram illustrating a state of imaging light when the second aperture member is used.

FIG. 20A is a diagram illustrating a state of illumination light when the second aperture member is used. FIG. 20B is a diagram illustrating a state of imaging light when the second aperture member is used. FIG. 20A illustrates a state of illumination light applied to a second aperture member 70. It is possible that the illuminated region of the illumination light is regarded as the pupil of the illumination optical system. Accordingly, FIG. 20A illustrates a state in which the pupil of the illumination optical system is superimposed on the second aperture member 70.

The second aperture member 70 includes a light-shielding part 70a and an opening 70b. When the second aperture member 70 is inserted into the optical path of the illumination optical system, the second aperture member 70 is disposed such that the light-shielding part 70a includes the optical axis 10. The opening 70b is located in a place eccentric to the optical axis 10.

A boundary line 71 is formed between the light-shielding part 70a and the opening 70b. The shielding part 70a and the opening 70b are divided by the boundary line 71.

When the pupil of the illumination optical system is superimposed on the second aperture member 70, the boundary line 71 and the outer edge of the pupil of the illumination optical system cross at a point 72 and a point 73. The point 72 and the point 73 are the predetermined two points. A straight line 74 is a straight line running through the point 72 and the point 73.

The boundary line 71 is formed of an arc. The arc is formed to project from the opening 70b toward the light-shielding part 70a. Accordingly, in the second aperture member 70, the boundary line 71 is positioned between the straight line 74 and the optical axis 10.

In the second aperture member 70, the boundary line 71 is a line formed of a curve. However, the boundary line 71 may be any of a line formed of a plurality of straight lines, a line formed of a plurality of curves, and a line formed of a curve and a straight line.

FIG. 20B illustrates a state of imaging light at the position of the pupil 7 of the objective lens. A boundary line 75 is a third boundary line. The boundary line 75 is an image of the boundary line 71. A boundary line 76 is an external boundary line. The boundary line 76 is formed of part of the outer edge of the pupil 7 of the objective lens. The light flux transmission region 77 is surrounded by the boundary line 75 and the boundary line 76.

Both the boundary line 75 and the boundary line 76 have a projecting shape. The direction of the projection is directly opposite between the boundary line 75 and the boundary line 76. In this case, the shape of the light flux transmission region 77 is a biconvex shape. Accordingly, it can be said that the boundary line 75 is formed of a convex line facing the optical axis 10 side.

In the case where the boundary line located on the optical axis side is formed of a convex line facing the optical axis side, the boundary line is defined as "boundary line of type 3". The boundary line 71 and the boundary line 75 serve as boundary lines of type 3.

Figure 21A:
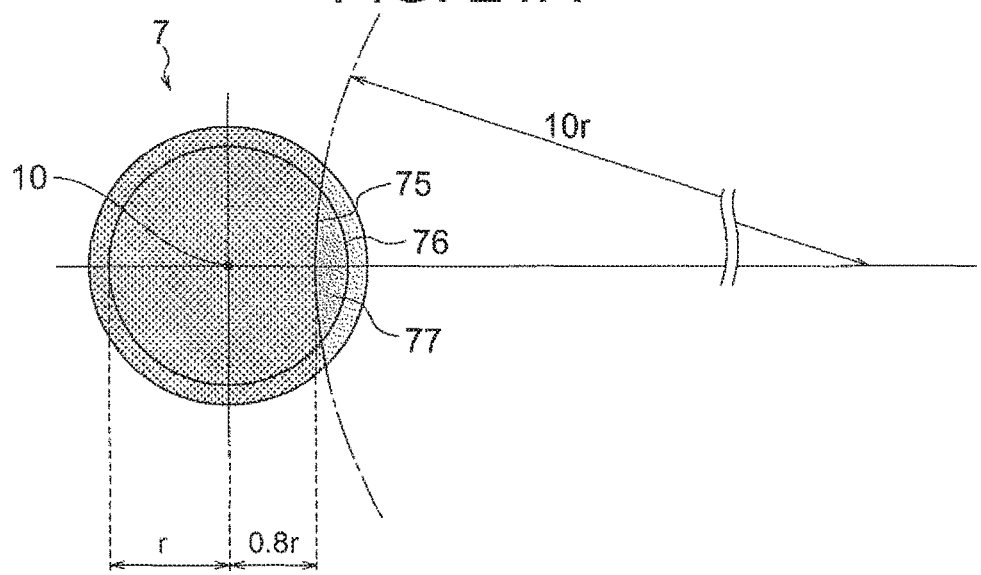
FIG. 21A is a diagram illustrating a state of imaging line in a boundary line of type 3.

As described above, although the correlation characteristic differs according to a distribution pattern of the light intensity in the illumination light, the correlation characteristic also differs according to the shape of the boundary lines. FIG. 21A is a diagram illustrating a state of imaging light in the boundary line of type 3.

Figure 21B:
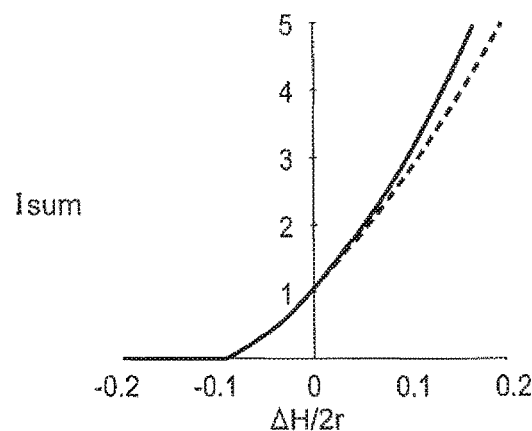
FIG. 21B is a diagram illustrating correlation characteristics in an X direction in the boundary line of type 3.

The correlation characteristics in the X direction in the boundary line of type 3 are as illustrated in the graph illustrated in FIG. 21B. The correlation characteristics in the Y direction in the boundary line of type 3 are as illustrated in the graph illustrated in FIG. 21C. The graphs of FIG. 21B and FIG. 21C are graphs illustrating results of simulations.

In the simulation in the boundary line of type 3, as illustrated in FIG. 21A, the radius of the pupil 7 of the objective lens is r, and the distance from the optical axis 10 to the boundary line 75 is 0.8×r. The boundary line 75 is formed of an arc of a circle having a radius of 10×r. The distance from the optical axis 10 to the boundary line 75 is a distance in a direction in which the light flux transmission region 77 is shifted.

Figure 21C:
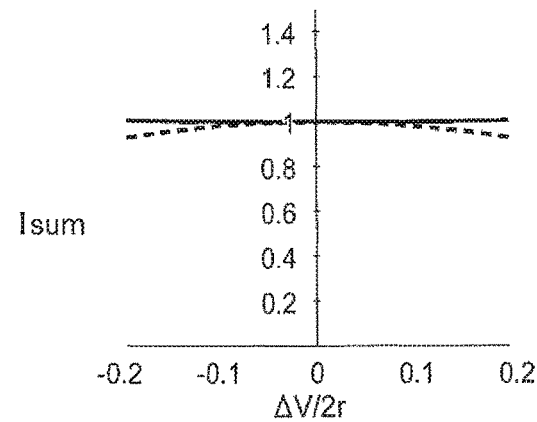
FIG. 21C is a diagram illustrating correlation characteristics in a Y direction in the boundary line of type 3.

FIG. 21B and FIG. 21C are diagrams illustrating correlation characteristics in the boundary line of type 3. FIG. 21B is a diagram illustrating correction characteristics in the X direction. FIG. 21C is a diagram illustrating correction characteristics in the Y direction. FIG. 21B and FIG. 21C illustrate a correlation characteristic in the illumination light $L_{uni}$ and a correlation characteristic in the illumination light 50.

The graphs of FIG. 21B and FIG. 21C are graphs illustrating results of simulations. In the graphs of FIG. 21B and FIG. 21C, the simulation result in the illumination light 50 is represented by a solid line, and the simulation result in the illumination light $L_{uni}$ is represented by a broken line. In both the simulations, the value of the vertical axis is standardized with a value at a time of $\Delta H/2r=0$, or a value at a time of $\Delta V/2r=0$.

The correlation characteristics in the X direction will be compared below using FIG. 14C and FIG. 21B. As illustrated in FIG. 14C and FIG. 21B, in both the drawings, the tilt in the solid line is larger than the tilt in the broken line. This means that the detection sensitivity in the illumination light 50 is higher than the detection sensitivity in the illumination light $L_{uni}$, both in the boundary line of type 1 and the boundary line of type 2.

Next, the correlation characteristics in the Y direction will be compared below using FIG. 19B and FIG. 21C. Also in the following description, "fluctuations in quantity of light" is used instead of "fluctuations in sum total of light intensities".

As illustrated in FIG. 19B and FIG. 21C, the solid line is a straight line in FIG. 21C, while the solid line is a curve in FIG. 19B. This means that, in the case of using the illumination light 50, fluctuations in quantity of light occurs in the Y direction when the boundary line of type 1 is used, while it is possible to prevent occurrence of fluctuations in quantity of light in the Y direction when the boundary line of type 3 is used.

Moreover, as illustrated in FIG. 19B and FIG. 21C, the broken line is a curve in FIG. 21C, while the broken line is a straight line in FIG. 19B. This means that, in the case of using the illumination light $L_{uni}$, fluctuations in quantity of light occurs in the Y direction when the boundary line of type 3 is used, while it is possible to prevent occurrence of fluctuations in quantity of light in the Y direction when the boundary line of type 1 is used.

When the comparison results described above are put together, the results are as illustrated in Table 2 below. The first direction is a direction in which the opening (light flux transmission region) of the aperture member is located. The second direction is a direction orthogonal to the first direction.

TABLE 2

| Light intensity distribution | | | Boundary line | |
| --- | --- | --- | --- | --- |
| | | | Type 1 | Type 3 |
| Illumination light $L_{uni}$ (uniform) | Detection sensitivity (first direction) | | low | high |
| | Measurement range (first direction) | | broad | Narrow |
| | Fluctuations in quantity of light (second direction) | | not exist | exist |
| Illumination light 50 (center < periphery) | Detection sensitivity (first direction) | | low | high |
| | Measurement range (first direction) | | broad | narrow |
| | Fluctuations in quantity of light (second direction) | | exist | not exist |

As described above, when fluctuations in quantity of light occurs in the second direction at a time of performing measurement of the amount of tilt in the first direction, a measurement error occurs. In the sample shape measuring method of the present embodiment, in the case of using the illumination light 50, the boundary line of type 3 is used. For this reason, even though the detection sensitivity is high, no fluctuations in quantity of light occur in the second direction, when measurement of amount of tilt is performed in the first direction. Accordingly, it is possible to perform measurement of amount of tilt with little error.

Moreover, it is found from Table 2 that it is effective to use a combination of the illumination light $L_{uni}$ and the boundary line of type 1, or use a combination of the illumination light 50 and the boundary line of type 3, in order to prevent occurrence of a measurement error. These two combinations are different in detection sensitivity (measurement range). Therefore, one of the combinations may be used in accordance with the sample and/or the purpose of measurement.

In the case of using the boundary line of type 3, it is preferable that the boundary line be an arc, and satisfy Conditional Equation (9) below.

$$0.3<(\beta-50\alpha+35)\cdot d<10 \qquad (9)$$

where $$\alpha=L_\alpha/r,\ \beta=L_\beta/r\,(\beta>1),$$

$L_\alpha$ is a minimum distance of distances from the center of the pupil of the objective lens to the second boundary line, $L_\beta$ is a radius of the second boundary line, r is a radius of the pupil of the objective lens, and d is a difference between the light intensity in the center of the pupil of the objective lens and the light intensity at the outer edge of the pupil of the objective lens.

As another example, it is more preferable that the boundary line satisfy Conditional Equation (9') below.

$$0.7<(\beta-50\alpha+35)\cdot d<6 \qquad (9')$$

Figure 22A:
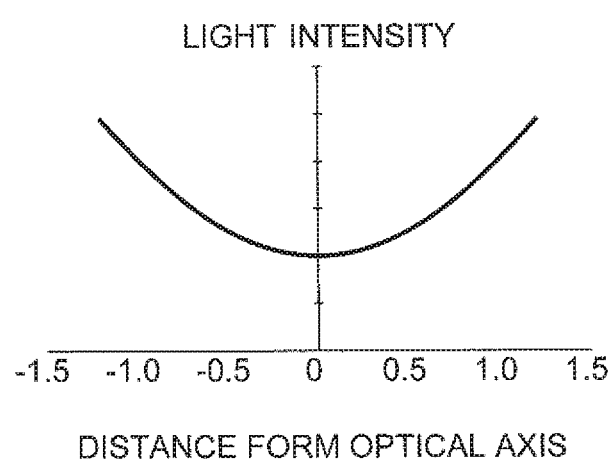
FIG. 22A is a diagram illustrating a light intensity at a pupil position of the objective lens.
Figure 22B:
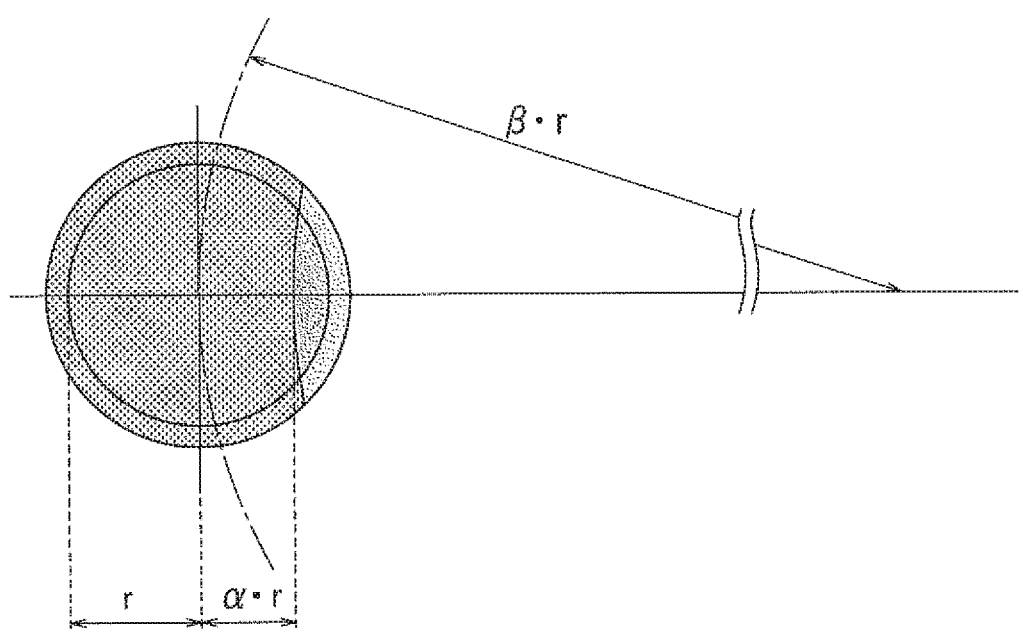
FIG. 22B is a diagram illustrating a state of a third boundary line at a pupil position of the objective lens.

FIG. 22A and FIG. 22B are diagrams for explaining parameters of Conditional Equation (9). Conditional Equations (9) and (9') are premised on (IA), (IB), and (IC) described above.

FIG. 22A is a diagram illustrating the light intensity at the pupil position of the objective lens. When the aperture member is disposed in the optical path, imaging light does not reach the center of the pupil of the objective lens. In this case, it is impossible to set the value of d. For this reason, as stated in (IC), the value of d is set on the supposition that the whole pupil of the objective lens is filled with illumination light.

FIG. 22B is a diagram illustrating a state of the third boundary line at the pupil position of the objective lens. As illustrated in FIG. 22B, the position of the third boundary line is determined according to the value of α, and the radius of the arc of the third boundary line is determined according to the value of β.

In the sample shape measuring method of the present embodiment, it is preferable that the light intensity of the illumination light incident on the predetermined illumination region be changed in one direction of two orthogonal directions, and flat in the other direction.

Figure 23:
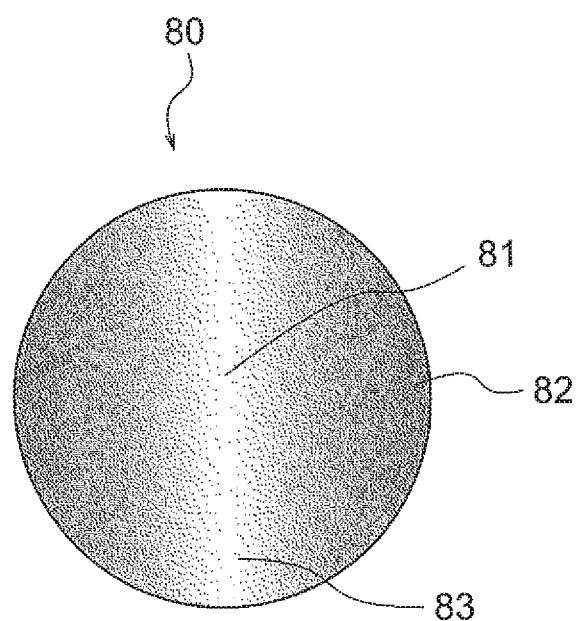
FIG. 23 is a diagram illustrating a light intensity distribution of illumination light.

FIG. 23 is a diagram illustrating a light intensity distribution of illumination light. Illumination light 80 is illumination light with a non-uniformly distributing light intensity. Directly before incidence on the aperture member, the shape of the illumination light 80 is circular. In the illumination light 80 illustrated in FIG. 23, the light intensity changes in the X direction, and the light intensity is flat in the Y direction.

In the X direction, the light intensity in center 81 of the light flux is larger than the light intensity at a periphery 82 of the light flux. Moreover, the light intensity decreases from the center 81 toward the periphery 82. In the Y direction, the light intensity in the center 81 and the light intensity in the periphery 82 are the same. Although it is preferable that the light intensity in the Y direction be the same, it is difficult to set the light intensity completely the same. Accordingly, it suffices that the light intensity in the Y direction is substantially the same.

Figure 24A:
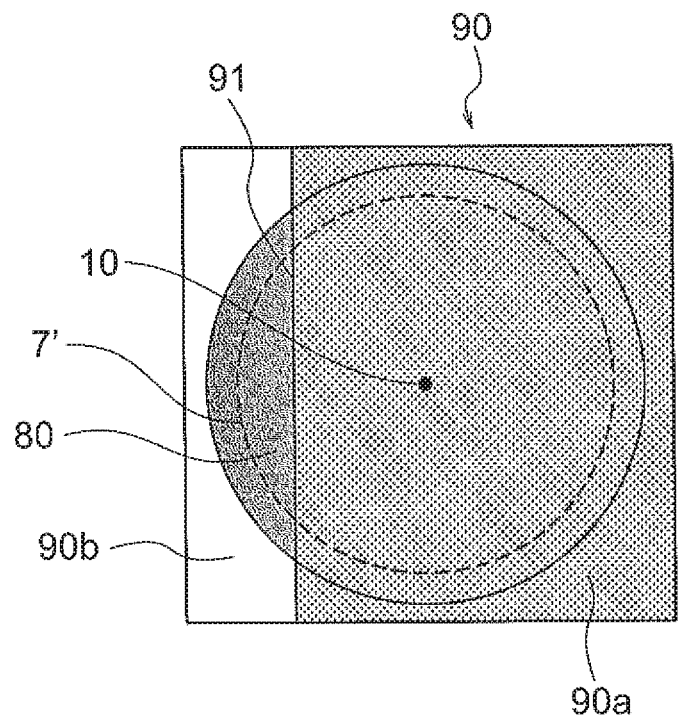
FIG. 24A is a diagram illustrating a state of illumination light.
Figure 24B:
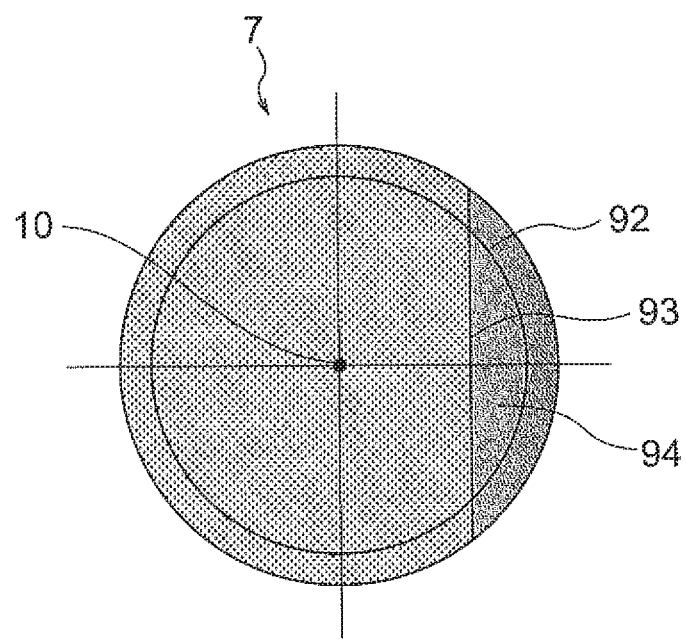
FIG. 24B is a diagram illustrating a state of imaging light.

FIG. 24A is a diagram illustrating a state of illumination light. FIG. 24B is a diagram illustrating a state of imaging light. FIG. 24A illustrates a state of the illumination light 80 applied to an aperture member 90. It is possible that the illuminated region of the illumination light 80 is regarded as the pupil of the illumination optical system. Accordingly, a state in which the pupil of the illumination optical system is superimposed on the aperture member 90 is illustrated in FIG. 24A.

The aperture member 90 includes a light-shielding part 90a and an opening 90b. When the aperture member 90 is inserted into the optical path of the illumination optical system, the aperture member 90 is disposed such that the light-shielding part 90a includes the optical axis 10. The opening 90b is located in a place eccentric to the optical axis 10.

A boundary line 91 is formed between the light-shielding part 90a and the opening 90b. The light-shielding part 90a and the opening 90b are divided by the boundary line 91. The boundary line 91 is a line parallel with a straight line orthogonal to the optical axis 10.

FIG. 24B illustrates a state of imaging light at the position of the pupil 7 of the objective lens. A boundary line 93 is a first boundary line. The boundary line 93 is an image of the boundary line 91. A boundary line 92 is an external boundary line. The boundary line 92 is formed of part of an outer edge of the pupil 7 of the objective lens. A light flux transmission region 94 is surrounded by the boundary line 92 and the boundary line 93.

Figure 25:
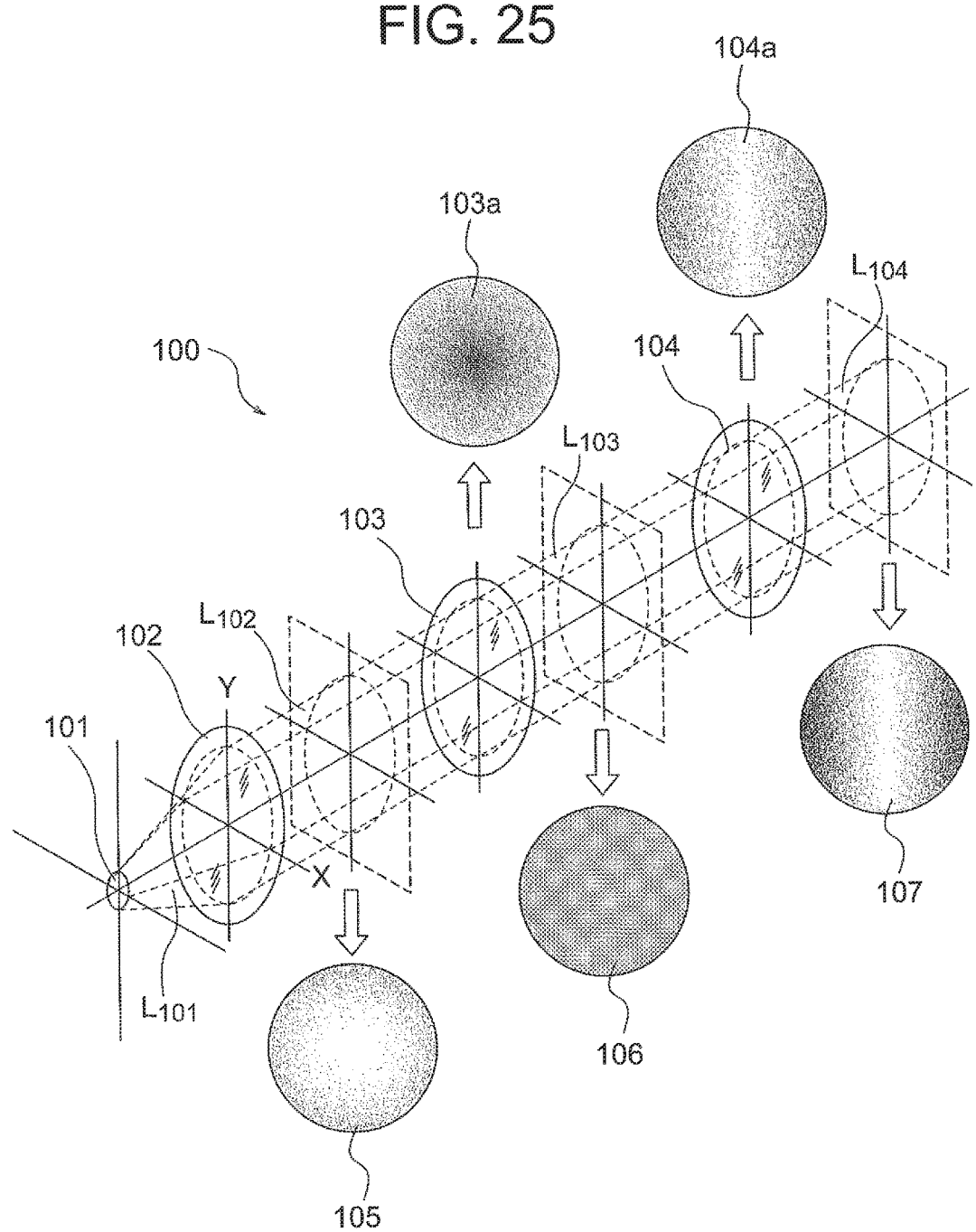
FIG. 25 is a diagram illustrating a first example of an illumination optical system.

FIG. 25 illustrates an illumination optical system to generate the illumination light 80. FIG. 25 illustrates a first example of the illumination optical system. An illumination optical system 100 includes a light source 101, a lens 102, a first optical filter 103, and a second optical filter 104.

The light source 101 is a point light source. In FIG. 25, a light generating unit is illustrated large, for easy viewing. The light source 101 may be a surface light source.

Illumination light $L_{101}$ is emitted from the light source 101. The illumination light $L_{101}$ has a light intensity distribution 105 that is the same as that of the illumination light 20 illustrated in FIG. 9. The magnitude of the light intensity is also the same as the light intensity in the illumination light 20. The illumination light $L_{101}$ is incident on the lens 102.

From the lens 102, illumination light $L_{102}$ is transmitted as parallel light flux. The light intensity distribution 105 in the illumination light $L_{102}$ is the same as the light intensity distribution in the illumination light 20. The magnitude of the light intensity is also the same as the light intensity in the illumination light 20. The illumination light $L_{102}$ transmitted through the lens 102 is incident on the optical filter 103.

The first optical filter 103 has a first transmittance characteristic 103a. In the first transmittance characteristic 103a, the transmittance differs between the center and the periphery. The transmittance in the center is lower than the transmittance in the periphery. Moreover, the transmittance increases from the center toward the periphery. Therefore, in the illumination light $L_{102}$, light passing through a place closer to the center is reduced more.

The illumination light $L_{103}$ is transmitted through the first optical filter 103. For example, in the light intensity distribution 105, the light intensity in the center is 1, the light intensity in the intermediate is 0.8, and the light intensity in the periphery is 0.5. Moreover, in the first transmittance characteristic 103a, the transmittance in the center is 50%, the light intensity in the intermediate is 62.5%, and the transmittance in the periphery is 100%. In this case, the light intensity of the illumination light $L_{103}$ is 0.5 in any of the center, the intermediate, and the periphery.

Then, the shape of the curve representing the first transmittance characteristic 103a is set reverse to the shape of the curve representing the light intensity distribution 105. By doing this, the illumination light $L_{103}$ having a light intensity distribution 106 is transmitted through the first optical filter 103. In the light intensity distribution 106, in any direction, the light intensity is flat from the center to the periphery. The illumination light $L_{103}$ transmitted through the first optical filter 103 is incident on the second optical filter 104.

The second optical filter 104 has a second transmittance characteristic 104a. In the second transmittance characteristic 104a, the light intensity is changed in one direction of two orthogonal directions, and the light intensity is flat in the other direction.

Specifically, in the X direction, the transmittance differs between the center and the periphery. The transmittance in the center is higher than the transmittance in the periphery. Moreover, the transmittance decreases from the center toward the periphery. By contrast, in the Y direction, the transmittance is the same between the center and the periphery. Therefore, in the illumination light $L_{103}$, light passing through a place closer to the periphery is reduced more in the X direction, while the light is not reduced in the Y direction.

The illumination light $L_{104}$ is transmitted through the second optical filter 104. The illumination light $L_{104}$ has a light intensity distribution 107. In the light intensity distribution 107, the light intensity decreases from the center toward the periphery in the X direction, while the light intensity in the Y direction is flat from the center toward the periphery.

Figure 26:
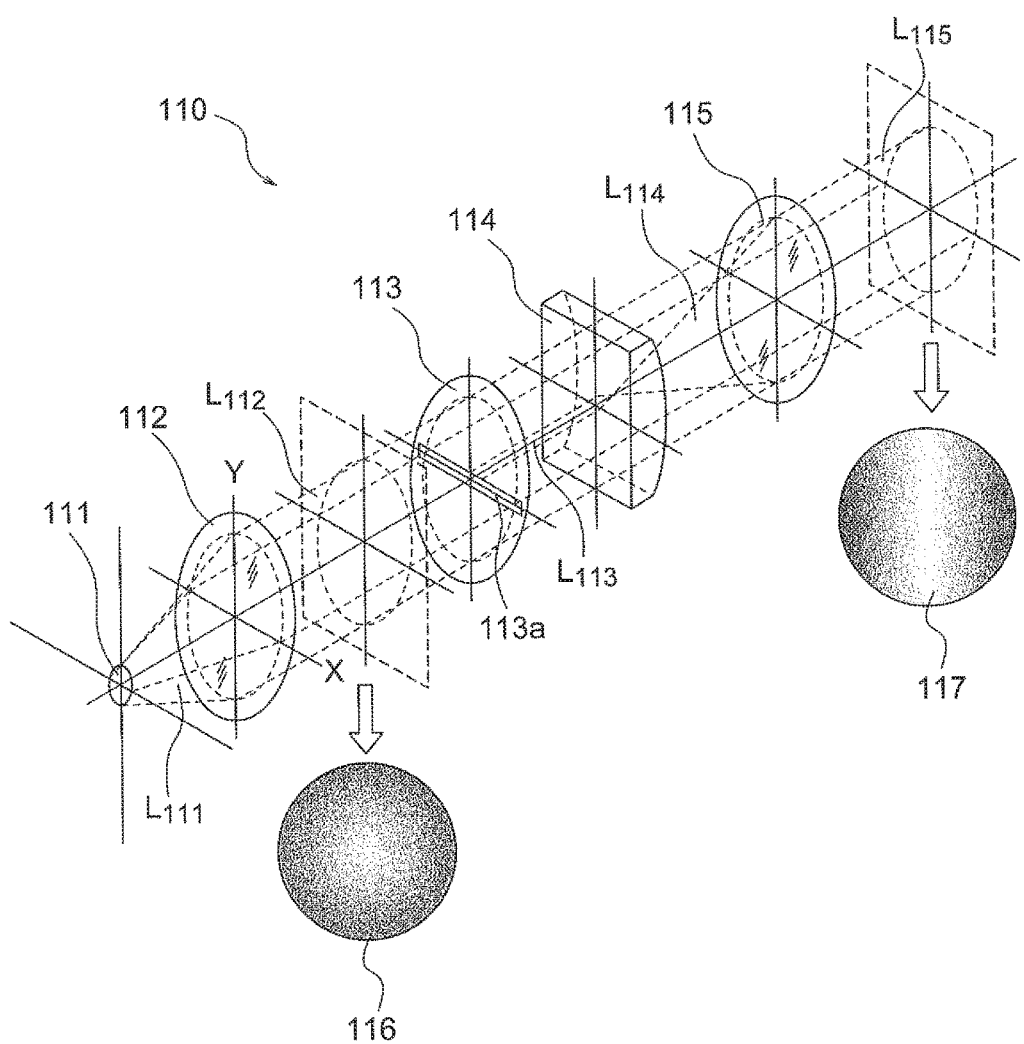
FIG. 26 is a diagram illustrating a second example of the illumination optical system.

FIG. 26 illustrates another illumination optical system to generate the illumination light 80. FIG. 26 illustrates a second example of the illumination optical system. An illumination optical system 110 includes a light source 111, a lens 112, an aperture member 113, a cylindrical lens 114, and a lens 115.

The light source 111 is a point light source. In FIG. 26, a light generating unit is illustrated large, for easy viewing. The light source 111 may be a surface light source.

Illumination light $L_{111}$ is emitted from the light source 111. The illumination light $L_{111}$ has a light intensity distribution 116 that is the same as that of the illumination light 20 illustrated in FIG. 9. However, the magnitude of the light intensity is different from the light intensity in the illumination light 20. The illumination light $L_{111}$ is incident on the lens 112.

From the lens 112, illumination light $L_{112}$ is transmitted as parallel light flux. The light intensity distribution 116 in the illumination light $L_{112}$ is the same as the light intensity distribution in the illumination light 20. However, the magnitude of the light intensity is different from the light intensity in the illumination light 20. The illumination light $L_{112}$ transmitted through the lens 112 is incident on the aperture member 113.

The aperture member 113 includes a rectangular opening 113a in a center portion thereof. The shape of the opening 113a is rectangular, and includes long sides provided parallel with the X direction. In the aperture member 113, part of the region of the illumination light $L_{112}$ passes through the opening 113a, and the other region is blocked. Illumination light $L_{113}$ is transmitted through the aperture member 113. The shape of the illumination light $L_{113}$ is rectangular.

In the illumination light $L_{112}$, the light intensity is changed both in the X direction and the Y direction. In the opening 113a, the long sides are located so as to be parallel with the X direction. The length of the long sides is substantially the same as the light flux diameter of the illumination light $L_{112}$. Therefore, in the X direction of the illumination light $L_{113}$, change in light intensity occurs. By contrast, in short sides located so as to be parallel with the Y direction, the length of the sides is very short. Therefore, in the Y direction of the illumination light $L_{113}$, change in light intensity hardly occurs.

As described above, in the illumination light $L_{113}$, the light intensity is changed in one direction of two orthogonal directions, and the light intensity is flat in the other direction. The illumination light $L_{113}$ is incident on the cylindrical lens 114.

In the illumination light $L_{113}$, the length of the light flux in the X direction is substantially the same as the light flux diameter of the illumination light $L_{112}$. By contrast, the length of the light flux in the Y direction is shorter than the light flux diameter of the illumination light $L_{112}$. In a cylindrical lens, light refraction occurs only in one direction of two orthogonal directions. Then, the cylindrical lens 114 is disposed such that refraction occurs in the Y direction. By doing this, it is possible to increase the length of the light flux in the Y direction, without changing the length of the light flux in the X direction.

The illumination light $L_{114}$ is transmitted through the cylindrical lens 114. The shape of the illumination light $L_{114}$ is circular. Moreover, the illumination light $L_{114}$ has a light intensity distribution 117. In the light intensity distribution 117, the light intensity decreases from the center toward the periphery in the X direction, while the light intensity in the Y direction is flat from the center to the periphery.

As described above, it is possible to generate the illumination light 80 by using the illumination optical system 100 and/or the illumination optical system 110.

It is preferable that the sample shape measuring method of the present embodiment include a step of changing the position of the predetermined illumination region, the predetermined illumination region before change and the predetermined illumination region after change be located on a circumference with the optical axis serving as the center, and a distribution direction of the light intensity in the predetermined illumination region before change agree with a distribution direction of the light intensity in the predetermined illumination region after change, when the predetermined illumination region before change be rotated around the optical axis and superimposed on the predetermined illumination region after change.

Figure 27A:
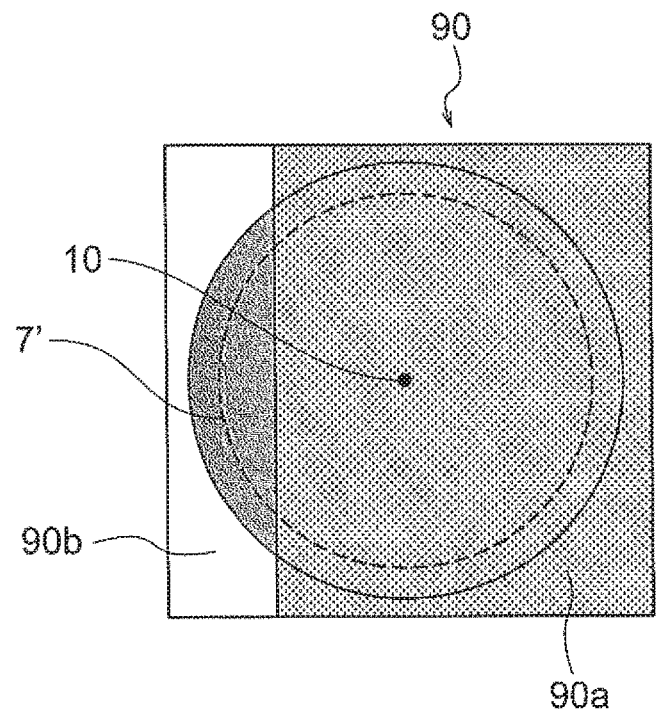
FIG. 27A is a diagram illustrating a state of illumination light at a first position.

In step S10, a predetermined illumination region is set in a desired position in the illumination optical system. Here, the position set in step S10 is referred to as the first position. FIG. 27A illustrates a state of illumination light in the first position. In FIG. 27A, the opening 90b corresponds to the predetermined illumination region.

As illustrated in FIG. 27A, in the first position, the opening 90b is located in the X direction. Accordingly, in the first position, it is possible to obtain the amount of tilt in the surface of the sample, with respect to the X direction. Moreover, the light intensity distribution of illumination light in the opening is changed in the X direction, but is flat in the Y direction.

At the first position, step S20 and step S30 are executed. Step S20 and step S30 are the first predetermined processing steps. In this manner, it is possible to obtain the amount of tilt in the surface of the sample, with respect to the X direction.

Figure 27B:
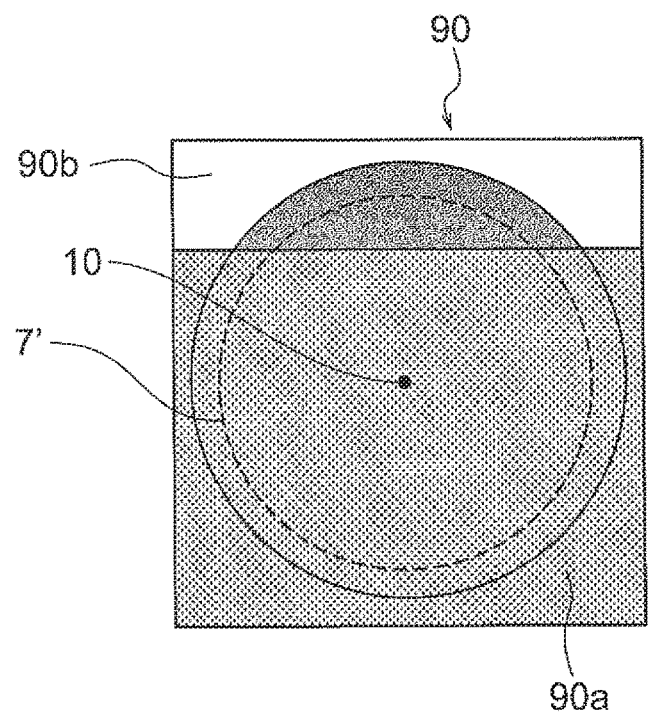
FIG. 27B is a diagram illustrating a state of illumination light at a second position.

After the predetermined processing steps at the first position are finished, a step of changing the position of the predetermined illumination region is executed. By execution of the step, the predetermined illumination region is moved to the second position. The second position is a position different from the first position. FIG. 27B illustrates a state of illumination light in the second position.

As illustrated in FIG. 27B, the second position is a position obtained by rotating the first position by 90° around the optical axis 10. At the second position, the opening 90b is located in the Y direction. Accordingly, at the second position, it is possible to obtain the amount of tilt in the surface of the sample, with respect to the Y direction. Moreover, the light intensity distribution of illumination light in the opening is changed in the Y direction, but is flat in the X direction.

At the second position, step S20 and step S30 are executed. Step S20 and step S30 are the second predetermined processing steps. In this manner, it is possible to obtain the amount of tilt in the surface of the sample, with respect to the Y direction.

The first position is a position before the position of the opening 90b is changed. The second position is a position after the position of the opening 90b is changed. As described above, the second position is a position obtained by rotating the first position by 90° around the optical axis 10. Accordingly, the opening 90b at the first position and the opening 90b at the second position are located on a circumference with the optical axis 10 serving as the center.

Moreover, when the opening 90b at the first position is rotated around the optical axis 10, the opening 90b at the first position is superimposed on the opening 90b at the second position. In this state, their distribution directions of the light intensity agree.

By doing this, it is possible to measure the amount of tilt, with the measurement sensitivity and the measurement range maintained at a flat level, regardless of the position of the opening 90b. Moreover, when the amount of tilt in the surface of the sample is obtained using the lookup table described above, it is possible to set the number of the lookup table to one.

In the illumination light 80, when the position of the opening 90b is changed, the direction of distribution of the light intensity in illumination light have to be changed. To change the direction of distribution of the light intensity, it suffices that the second optical filter 104 is rotated around the optical axis 10, in the illumination optical system 100 (FIG. 25). In the illumination optical system 110 (FIG. 26), it suffices that the aperture member 113 and the cylindrical lens 114 around the optical axis 10.

In the sample shape measuring method of the present embodiment, it is preferable to include a step of calculating the shape of the sample from the amount of tilt and visualizing the shape of the sample from the calculated shape.

Figure 28:
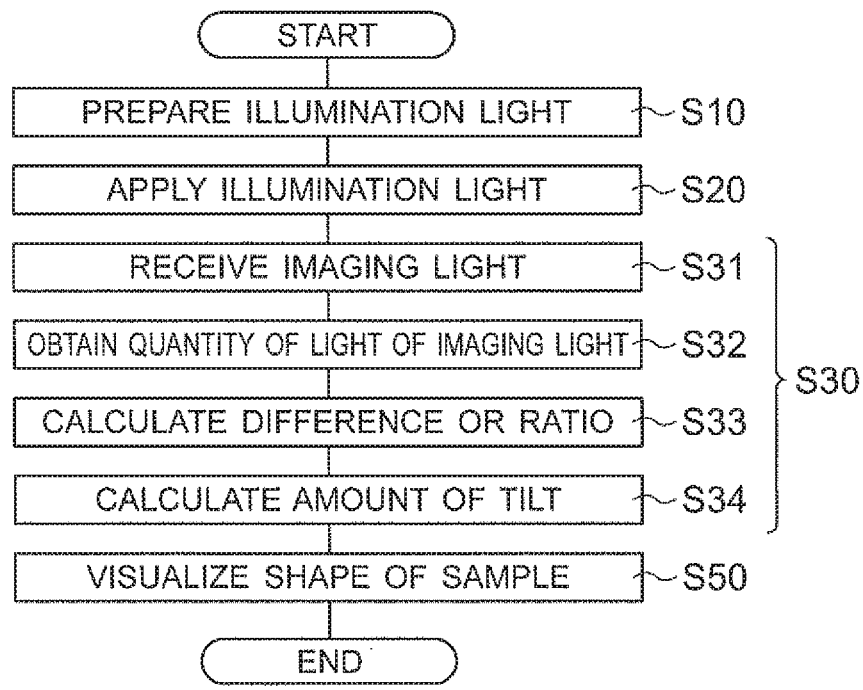
FIG. 28 is a flowchart of a sample shape measuring method according to the present embodiment.

The sample shape measuring method of the present embodiment will be described. FIG. 28 is a flowchart of the sample shape measuring method of the present embodiment. The same step as in the flowchart in FIG. 8 is denoted by the same numeral and will not be further elaborated. The sample shape measuring method of the present embodiment includes the basic measurement method and step S50 of visualizing the shape of the sample.

In the sample shape measuring method of the present embodiment, when step S34 is finished, step S50 is executed. In step S50, the shape of the sample 8 is calculated from the amount of tilt, and the shape of the sample 8 is visualized from the calculated shape. By doing this, it is possible to visually grasp the shape of the sample. Step S30 may include step S50.

Furthermore, in the sample shape measuring method of the present embodiment, it is preferable that the reference quantity of light be a quantity of light in a state in which no sample is present.

When the same sample is illuminated with illumination light with different quantities of light, the quantity of light of the imaging light also varies. Thus, if the amount of tilt is calculated using the quantity of light of the imaging light alone, the surface shape changes with the quantity of light of the illumination light even though the sample is the same. Then, in the sample shape measuring method of the present embodiment, the difference or the ratio between the quantity of light of the imaging light and the reference quantity of light is calculated. By doing this, it is possible to precisely obtain the surface shape of the sample even when the quantity of light of the illumination light changes.

Since a reference quantity of light is the quantity of light in a state in which no sample is present, the reference quantity of light is the quantity of light of the illumination light. Therefore, by calculating the difference or the ratio to the quantity of light of the imaging light using the reference quantity of light, it is possible to precisely obtain the surface shape of the sample even when the quantity of light of the illumination light changes.

Furthermore, it is preferable that the sample shape measuring method of the present embodiment include a step of setting the reference quantity of light between the step of preparing illumination light and the step of applying the illumination light to a sample.

As described above, the reference quantity of light is the quantity of light in a state in which no sample is present. In step S33, the difference or the ratio to the quantity of light of the imaging light is calculated using the reference quantity of light. Thus, it is possible to precisely obtain the surface shape of the sample even when the quantity of light of the illumination light changes.

Furthermore, in the sample shape measuring method of the present embodiment, it is preferable that, in the step of setting the reference quantity of light, the quantity of light be measured by applying illumination light transmitted through the illumination optical system to the observation optical system, and the reference quantity of light be set based on the measured quantity of light.

In step S60, the quantity of light is measured by applying illumination light transmitted through the illumination optical system to the observation optical system in a state in which no sample is present. Thus, it is possible to obtain the quantity of light in a state in which no sample is present. Then, the reference quantity of light is set based on the measured quantity of light.

Furthermore, in the sample shape measuring method of the present embodiment, it is preferable that measurement of the quantity of light be performed before the initial measurement of the sample.

By doing so, the reference quantity of light is measured immediately before the sample shape is measured. Thus, it is possible to increase the accuracy of the difference or the ratio calculated in step S33. As a result, it is possible to precisely calculate the amount of tilt.

Furthermore, in the sample shape measuring method of the present embodiment, it is preferable that the measured quantity of light be stored, and the reference quantity of light be set by reading the quantity of light stored before the initial measurement of the sample.

By doing so, it becomes unnecessary to measure the reference quantity of light every time a sample shape is to be measured. Therefore, it is possible to reduce the measurement time.

The sample shape measuring apparatus of the present embodiment will be described below. The sample shape measuring apparatus according to the present embodiment includes an illumination optical system, an observation optical system, a holding member, a detecting element, and a processing apparatus. The illumination optical system includes a light source, a condenser lens, and an aperture member. The observation optical system includes an objective lens and an imaging lens The holding member holds a sample and is disposed between the illumination optical system and the observation optical system. The aperture member has a light-shielding part and an opening. The light-shielding part is provided so as to include an optical axis of the condenser lens. The opening is provided at a position eccentric with respect to the optical axis. An image of the opening is formed in vicinity of a pupil position of the observation optical system and is formed so as to overlap part of an outer edge of a pupil of the observation optical system. A light intensity of the illumination light incident on the aperture member differs between a center and a periphery in a plane perpendicular to the optical axis. Illumination light applied to the sample by the illumination optical system is transmitted through the sample. Light transmitted through the sample is incident on the observation optical system. The detecting element receives light transmitted through the observation optical system. The processing apparatus obtains a quantity of light based on the received light, calculates a difference or a ratio between the quantity of light and a reference quantity of light, and calculates an amount of tilt in a surface of the sample based on the difference or the ratio.

Figure 29:
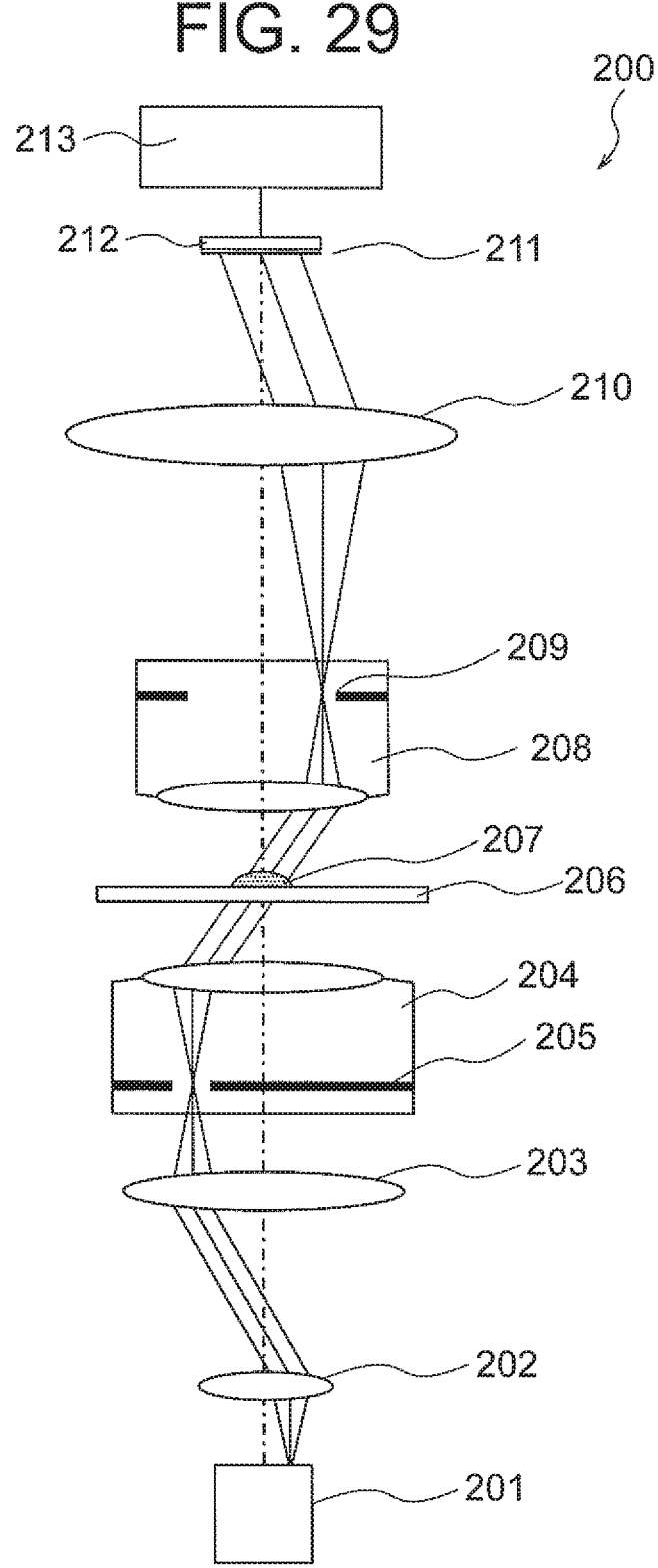
FIG. 29 is a diagram illustrating a structure of a sample shape measuring apparatus according to the present embodiment.

Referring to FIG. 29 the sample shape measuring apparatus of the present embodiment is described below. FIG. 29 is a diagram showing the configuration of the sample shape measuring apparatus of the present embodiment.

A sample shape measuring apparatus 200 is an upright microscope, for example, which includes an illumination optical system and an observation optical system. The illumination optical system includes a light source 201, a condenser lens 204 and an aperture member 205 The illumination optical system includes a lens 202 and a lens 203 as needed. Meanwhile, the observation optical system includes an objective lens 208 and an imaging lens 210.

Light emitted from the light source 201 passes through the lens 202 and the lens 203, and reaches the condenser lens 204. At the condenser lens 204, the aperture member 205 is provided. Herein, the condenser lens 204 and the aperture member 205 are integrally configured. However, the aperture member 205 and the condenser lens 204 may be configured as separate bodies. The aperture member 205 corresponds to the light-shielding member 4 in FIG. 1. A metal plate is used in the aperture member 205.

For example, the aperture member 30 illustrated in FIG. 10A may be used as the aperture member 205. As described above, the aperture member 30 includes the light-shielding part 30a and the opening 30b. The light-shielding part 30a is provided so as to include the optical axis 10. The opening 30b is provided at a position away from the optical axis.

The position of the light-shielding part 30a and the position of the opening 30b with respect to the optical axis 10 are determined by disposing the aperture member 30 in the optical path of the illumination optical system. Accordingly, by disposing the aperture member 30 such that the light-shielding part 30a includes the optical axis 10, the opening 30b is located in a place eccentric to the optical axis.

As illustrated in FIG. 10B, the image of the opening is formed in the vicinity of the pupil position of the observation optical system. FIG. 10B is a diagram illustrating a state of imaging light. In FIG. 10B, illustration of the outline of the opening 30b is omitted, although the light flux that has passed through the opening 30b is illustrated. Although the outline thereof is not illustrated, the image of the opening 30b is formed to overlap part of the outer edge of the pupil of the objective lens.

Moreover, in place of the condenser lens 204, a condenser unit having a reflecting surface may be used. The condenser unit may include, for example, a conical mirror and a concave mirror. The conical mirror is disposed on the optical axis. The concave mirror has an annular reflecting surface and is disposed to surround the conical mirror.

The aperture member 205 is conjugate to the light source 201. Therefore, the illumination light emitted from the light source 201 is collected at the position of the aperture member 205. That is, an image of the light source 201 is formed at the position of the aperture member 205.

Illumination light transmitted through the aperture member 205 enters the condenser lens 204. Here, the position of the aperture member 205 coincides with the focal position of the condenser lens 204 (or the pupil position of the condenser lens 204). Therefore, the illumination light transmitted through the condenser lens 204 becomes parallel light. The illumination light transmitted through the condenser lens 204 is transmitted so as to intersect with the optical axis of the observation optical system (the optical axis of the illumination optical system).

The illumination light transmitted through the condenser lens 204 reaches a sample 207. The sample 207 is placed on a holding member 206. The sample 207 is a cell, for example, which is colorless and transparent.

The light passing through the sample 207, i.e., imaging light enters a microscope objective lens 208 (hereinafter, referred to as an "objective lens"). This objective lens 208 is a microscope objective lens for bright-field observation, for example. Therefore, only a lens is present in the optical path of the objective lens 208, and no optical member to change the intensity or the phase of light, such as a phase plate or a modulation plate, is not present in the optical path.

As shown in FIG. 29, parallel light passing through the sample 207 is collected at a pupil 209 of the objective lens. As just described, the pupil 209 of the objective lens is conjugate to the aperture member 205. Therefore, an image of the aperture member 205 is formed at the position of the pupil 209 of the objective lens.

The imaging light transmitted through the objective lens 208 enters the imaging lens 210 Then, an optical image of the sample 207 is formed at an image position 211 by the imaging light transmitted through the imaging lens 210.

A detecting element 212 is disposed at the image position 211. The detecting element 212 is a photoelectric conversion element. Examples of the detecting element 212 include photodiode, CCD, and COMS.

The light intensity of an optical image is converted by the detecting element 212 into an electrical signal. The converted electrical signal is transmitted as image data of the sample 207 to the processing apparatus 213. The image data represents the quantity of light of the optical image.

In the processing apparatus 213, the processing is executed in accordance with the flowchart shown in FIG. 8. That is, in the processing apparatus 213, the quantity of light of the imaging light is obtained (step S32), the difference or the ratio between the quantity of light and the reference quantity of light is calculated (step S33), and the amount of tilt in the surface of the sample is calculated from the calculation result (step S34). Here, since a predetermined region is set, in step S32, the processing of obtaining the quantity of light is performed for the predetermined region in the image data.

As described above, in the sample shape measuring apparatus of the present embodiment, the light intensity of illumination light incident on the aperture member differs between the center and the periphery.

In many light sources, the light intensity of light emitted from the light source differs between the center and the periphery. Therefore, with the structure described above, it is possible to use light emitted from the light source as illumination light as it is, and/or use the light as illumination light through an optical system. Therefore, it is possible to easily prepare illumination light.

In this way, in the sample measuring apparatus of the present embodiment, illumination light deflected in a certain direction is merely applied to the sample. Thus, in derivation of the distribution of the amount of tilt in the surface of the sample, light transmitted through the sample, that is, light transmitted through the sample is merely utilized, and the contrast of an image or the interference between non-diffracted light and diffracted light is not utilized. Therefore, according to the sample measuring apparatus of the present embodiment, even for a sample in which the reflectance of the surface is low and the surface shape is smooth, it is possible to measure the amount of tilt in the surface of the sample with high accuracy.

In the sample shape measuring apparatus of the present embodiment, it is preferable that the light intensity distribution of illumination light incident on the aperture member be distributed axisymmetrically.

In the sample shape measuring apparatus of the present embodiment, it is preferable that the light intensity of illumination light incident on the aperture member decrease from the center toward the periphery of the light flux.

In the sample shape measuring apparatus of the present embodiment, it is preferable that the light intensity of illumination light incident on the aperture member increase from the center toward the periphery of the light flux.

In the sample shape measuring apparatus of the present embodiment, it is preferable that the light intensity of illumination light incident on the aperture member be changed in one direction of two orthogonal directions, and flat in the other direction.

It is preferable that the sample shape measuring apparatus of the present embodiment include a boundary line that separates the light-shielding part from the opening, and the boundary line be formed of a line parallel to one straight line orthogonal to the optical axis.

It is preferable that the sample shape measuring apparatus of the present embodiment include a mechanism of changing the position of the opening, the opening before change and the opening after change be located on a circumference with the optical axis serving as the center, and a distribution direction of the light intensity in the opening before change agree with a distribution direction of the light intensity in the opening after change, when the opening before change is rotated around the optical axis and superimposed on the opening after change.

Because the technical meaning of the sample shape measuring apparatus of the present embodiment has already been described, an explanation thereof herein will be omitted.

Figure 30A:
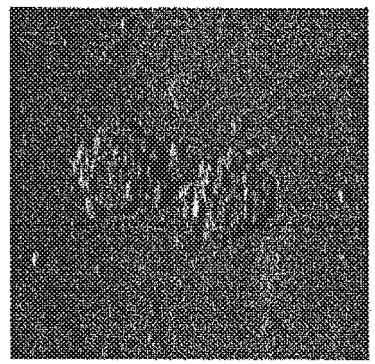
FIG. 30A is an electronic image illustrating a result (X direction) of executing Step S32.
Figure 30B:
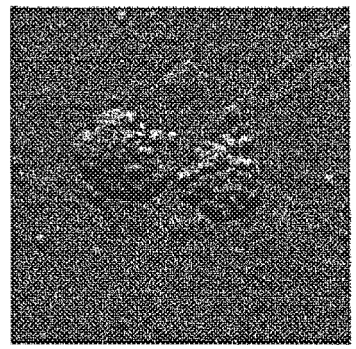
FIG. 30B is an electronic image illustrating a result (Y direction) of executing Step S32.
Figure 30C:
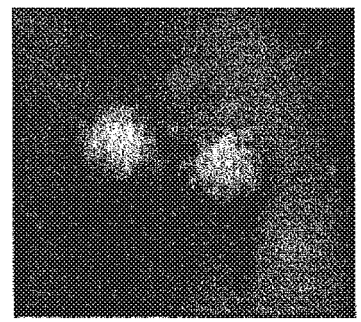
FIG. 30C is an electronic image illustrating a result of executing Step S50.
Figure 30D:
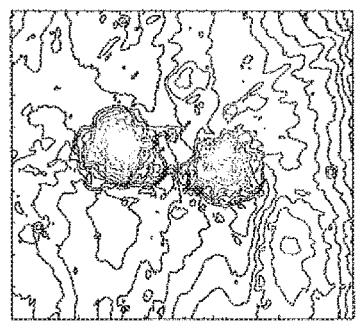
FIG. 30D is an image illustrating a result of executing Step S50.

Measurement examples by the sample measuring apparatus of the present embodiment are illustrated in FIG. 30A, FIG. 30B, FIG. 30C, and FIG. 30D. FIG. 30A illustrates an electronic image illustrating a result (X direction) of execution of step S32, FIG. 30B illustrates an electronic image illustrating a result (Y direction) of execution of step S32, FIG. 30C illustrates an electronic image illustrating a result of execution of step S50, and FIG. 30D illustrates an image illustrating a result of execution of step S50.

In obtaining of the electronic image of FIG. 30A, as illustrated in FIG. 10A, the opening 30 is located in the X direction, to obtain the quantity of light of imaging light. In obtaining of the electronic image of FIG. 30B, the opening 30 is located in the Y direction, to obtain the quantity of light of imaging light.

In the measurement examples, the sample is an iPS cell. The magnification of the objective lens is 20 times, and the numerical aperture is 0.4. A halogen lamp is used as the light source. Accordingly, the light intensity distribution in illumination light is approximately the light intensity distribution illustrated in FIG. 9.

Figure 31:
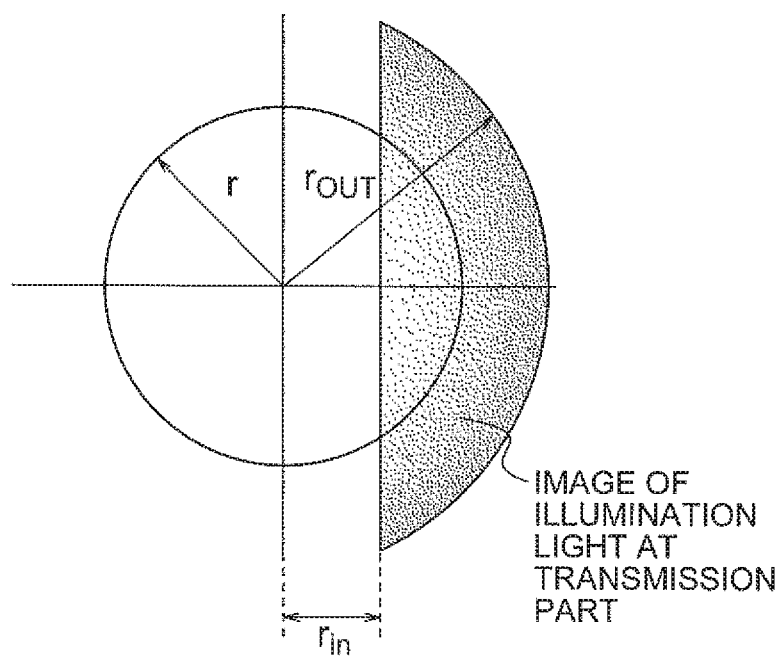
FIG. 31 is a diagram illustrating a state of light flux at a pupil position of the objective lens.

FIG. 31 illustrates a state of the light flux at the pupil position of the objective lens. $r_{in}=0.80r$, and $r_{out}=1.65r$.

In the measurement examples, prior to measurement of the sample, measurement of a reference sample is executed. In the reference sample, the amount of tilt in the surface of the sample is known. By executing measurement of a reference sample, data indicating relation between the quantity of light and the amount of tilt is obtained.

A lookup table is created using this data. Furthermore, when a lookup table has already been created, the data in the lookup table is updated as necessary. The method of using a lookup table has already been described and is not further elaborated here.

In an apparatus using the sample shape measuring method of the present embodiment, variations occur within a range of production tolerance in each of the members included in the apparatus. For example, the value of the numerical aperture of the objective lens or the value of magnification varies within a range of production tolerance. Furthermore, the boundary between the opening and the light-shielding part also varies within a range of production tolerance.

In measurement of the shape of a sample, the configuration of the observation optical system and the configuration of the illumination optical system are changed depending on samples. In the observation optical system, for example, in order to obtain the optimum field of view and resolution, an objective lens A is used for measurement of a sample A and an objective lens B is used for measurement of a sample B. Similarly, in the illumination optical system, for example, an aperture member A is used for measurement of a sample A and an aperture member B is used for measurement of a sample B.

Thus, if variation within a range of production tolerance exists in each of the members included in the apparatus, the correspondence relation between the quantity of light of the imaging light and the amount of tilt differs from the correspondence relation in the ideal state. As a result, a measurement error occurs.

Furthermore, even when there is no variation in individual members, for example, the boundary between the opening and the light-shielding part, variation occurs in arrangement position every time the aperture member is disposed in the optical path of the illumination optical system. As a result, variation occurs in the boundary between the opening and the light-shielding part. As a result, a measurement error occurs.

Furthermore, for example, the light source, the optical filter, or the condenser lens may be changed. If such a change in configuration takes place, the correspondence relation between the quantity of light of the imaging light and the amount of tilt varies among the configurations of the observation optical system or the configurations of the illumination optical system.

Then, by executing a measurement of a standard sample, it is possible to obtain the correspondence relation suited for the actual measurement. As a result, it is possible to obtain the amount of tilt in the surface of the sample more precisely. Furthermore, since the amount of tilt in the surface of the sample is calculated using a lookup table, it is possible to eliminate the step involving complicated computation.

Step the measurement of the standard sample may be executed at a time of the initial measurement. However, step the measurement of the standard sample may be executed every time measurement is performed.

When the variation described above is extremely small, the measurement of the standard sample may be executed at a time of production of the apparatus. In this case, the measurement of the standard sample is executed with various combinations of the configuration of the observation optical system and the configuration of the illumination optical system. A lookup table is then created based on the result obtained with each combination.

The result obtained by execution of the measurement of the standard sample may be calibrated with the reference quantity of light. By doing this, it is possible to obtain the amount of tilt in the surface of the sample even more precisely.

According to the present embodiment, it is possible to provide a sample shape measuring method and a sample shape measuring apparatus capable of easily preparing illumination light, and measuring a tilt and a shape of a sample with high accuracy, even when the sample is a sample having low surface reflectance and a smooth surface shape.

As described above, the present invention is suitable for a sample shape measuring method and a sample shape measuring apparatus capable of easily preparing illumination light, and measuring a tilt and a shape of a sample with high accuracy, even when the sample is a sample having low surface reflectance and a smooth surface shape.

What is claimed is:

1. A sample shape measuring method comprising:
a step of preparing illumination light passing through a predetermined illumination region;
a step of applying the illumination light to a sample; and
a predetermined processing step, wherein
the predetermined illumination region is set so as not to include an optical axis at a pupil position of an illumination optical system and is set such that the illumination light is applied to part of inside of a pupil and outside of the pupil at a pupil position of an observation optical system,
a light intensity of the illumination light incident on the predetermined illumination region differs between a center and a periphery,
the illumination light is transmitted through the sample,
light transmitted through the sample is incident on the observation optical system, and
the predetermined processing step includes:
a step of receiving light transmitted through the observation optical system;
a step of obtaining a quantity of light of the received light;
a step of calculating a difference or a ratio between the quantity of light and a reference quantity of light; and
a step of calculating an amount of tilt in a surface of the sample from the difference or the ratio.

2. The sample shape measuring method according to claim 1, wherein a light intensity distribution of the illumination light incident on the predetermined illumination region is distributed axisymmetrically.

3. The sample shape measuring method according to claim 1, wherein a light intensity of the illumination light incident on the predetermined illumination region decreases from a center toward a periphery of light flux.

4. The sample shape measuring method according to claim 1, wherein a light intensity of the illumination light incident on the predetermined illumination region increases from a center toward a periphery of light flux.

5. The sample shape measuring method according to claim 1, wherein
the light transmitted through the observation optical system is light passing through a light flux transmission region,
the light flux transmission region is a region surrounded by an external boundary line and a second boundary line,
the external boundary line is formed of part of an outer edge of the pupil of the observation optical system,
both the external boundary line and the second boundary line have a projecting shape,
and a direction of projection is equal between the external boundary line and the second boundary line.

6. The sample shape measuring method according to claim 1, wherein
the light transmitted through the observation optical system is light passing through a light flux transmission region,
the light flux transmission region is a region surrounded by an external boundary line and a third boundary line,
the external boundary line is formed of part of an outer edge of the pupil of the observation optical system,
both the external boundary line and the third boundary line have a projecting shape,
and a direction of projection is directly opposite between the external boundary line and the second boundary line.

7. The sample shape measuring method according to claim 1, wherein the light intensity of the illumination light incident on the predetermined illumination region is changed in one direction of two orthogonal directions, and flat in the other direction.

8. A sample shape measuring apparatus comprising:
an illumination optical system, an observation optical system; a holding member, a detecting element; and a processing apparatus,
the illumination optical system including a light source, a condenser lens, and an aperture member, and
the observation optical system including an objective lens and an imaging lens, wherein
the holding member holds a sample and is disposed between the illumination optical system and the observation optical system,
a light intensity of the illumination light incident on the aperture member differs between a center and a periphery in a plane perpendicular to an optical axis;
illumination light applied to the sample by the illumination optical system is transmitted through the sample,
light transmitted through the sample is incident on the observation optical system,
the detecting element receives light transmitted through the observation optical system, and
the processing apparatus
obtains a quantity of light based on the received light,
calculates a difference or a ratio between the quantity of light and a reference quantity of light, and
calculates an amount of tilt in a surface of the sample based on the difference or the ratio.

9. The sample shape measuring apparatus according to claim 8, wherein a light intensity distribution of the illumination light incident on the aperture member is distributed axisymmetrically.

10. The sample shape measuring apparatus according to claim 8, wherein alight intensity of the illumination light incident on the aperture member decreases from a center toward a periphery of light flux.

11. The sample shape measuring apparatus according to claim 8, wherein alight intensity of the illumination light incident on the aperture member increases from a center toward a periphery of light flux.

12. The sample shape measuring apparatus according to claim 8, wherein
the aperture member is a first aperture member,
the first aperture member includes a boundary line dividing a light-shielding part and an opening,
a straight line connecting predetermined two points is located between the boundary line and the optical axis, and
the predetermined two points are two points at which a predetermined line and an outer edge of a pupil of the illumination optical system crosses when the pupil of the illumination optical system is superimposed on the first aperture member.

13. The sample shape measuring apparatus according to claim 8, wherein
the aperture member is a second aperture member,
the second aperture member includes a boundary line dividing a light-shielding part and an opening,
the boundary line is located between a straight line connecting predetermined two points and the optical axis, and the predetermined two points are two points at which a predetermined line and an outer edge of a pupil of the illumination optical system crosses when the pupil of the illumination optical system is superimposed on the second aperture member.

14. The sample shape measuring apparatus according to claim 8, wherein the light intensity of the illumination light incident on the aperture member is changed in one direction of two orthogonal directions, and flat in the other direction.

* * * * *